United States Patent
Kim et al.

(10) Patent No.: US 10,517,049 B2
(45) Date of Patent: Dec. 24, 2019

(54) UPLINK SCHEDULING APPARATUS AND METHOD BASED ON UPLINK REPORT IN WIRELESS COMMUNICATION SYSTEM

(71) Applicant: Samsung Electronics Co., Ltd., Suwon-si, Gyeonggi-do (KR)

(72) Inventors: Soeng Hun Kim, Yongin-si (KR); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/299,877

(22) Filed: Mar. 12, 2019

(65) Prior Publication Data

US 2019/0208477 A1 Jul. 4, 2019

Related U.S. Application Data

(63) Continuation of application No. 15/720,678, filed on Sep. 29, 2017, now Pat. No. 10,231,195, which is a (Continued)

(30) Foreign Application Priority Data

Nov. 5, 2010 (KR) .................. 10-2010-0109664
Nov. 23, 2010 (KR) .................. 10-2010-0116958

(51) Int. Cl.
*H04W 52/36* (2009.01)
*H04W 52/54* (2009.01)
(Continued)

(52) U.S. Cl.
CPC .......... *H04W 52/365* (2013.01); *H04L 5/006* (2013.01); *H04L 5/0037* (2013.01);
(Continued)

(58) Field of Classification Search
CPC . H04W 52/365; H04W 52/367; H04W 52/54; H04W 72/1284; H04L 5/0037; H04L 5/0053; H04L 5/006; H04L 5/001
See application file for complete search history.

(56) References Cited

U.S. PATENT DOCUMENTS 8,462,705 B2  6/2013  Kim et al.
8,982,801 B2  3/2015  Shin et al.
(Continued)

FOREIGN PATENT DOCUMENTS

CN  101356768 A  1/2009
CN  102687577 A  9/2012
(Continued)

OTHER PUBLICATIONS

Nokia Siemens Networks et al., Power Headroom Reporting for Uplink Carrier Aggregation, 3GPP TSG RAN WG1 #61 Meeting R1-102946, May 10-14, 2010, http://www.3gpp.org/ftp/tsg_ran/WG1_RL1/TSGR%201_61/Docs/R1-102946.zip.
(Continued)

*Primary Examiner* — Duc C Ho
(74) *Attorney, Agent, or Firm* — Jefferson IP Law, LLP

(57) ABSTRACT

A method and an apparatus for scheduling uplink transmissions according to a maximum transmission power and Power Headrooms (PHs) reported by a User Equipment (UE) are provided. A method for reporting the PHs for carriers used by a terminal in a mobile communication system supporting carrier aggregation includes generating a message including the PHs along with indicators indicating whether a real transmission is scheduled on an uplink data channel of corresponding carrier, and including, when the real transmission is scheduled, a maximum transmission power used for calculating the PHs in the generated message.

20 Claims, 12 Drawing Sheets

Related U.S. Application Data continuation of application No. 15/278,524, filed on Sep. 28, 2016, now Pat. No. 9,788,285, which is a continuation of application No. 13/288,305, filed on Nov. 3, 2011, now Pat. No. 9,461,805.

(51) Int. Cl.
*H04L 5/00* (2006.01)
*H04W 72/12* (2009.01)

(52) U.S. Cl.
CPC ......... *H04L 5/0053* (2013.01); *H04W 52/367* (2013.01); *H04W 52/54* (2013.01); *H04W 72/1284* (2013.01); *H04L 5/001* (2013.01)

(56) References Cited

U.S. PATENT DOCUMENTS

| | | | |
|---|---|---|---|
| 9,392,553 | B2 | 7/2016 | Haim et al. |
| 9,419,768 | B2 * | 8/2016 | Kim ............... H04L 5/0058 |
| 9,426,752 | B2 | 8/2016 | Zhang et al. |
| 2007/0097962 | A1 | 5/2007 | Yoon et al. |
| 2008/0254819 | A1 | 10/2008 | Niwano et al. |
| 2010/0093386 | A1 | 4/2010 | Damnjanovic et al. |
| 2010/0238863 | A1 | 9/2010 | Guo et al. |
| 2011/0038271 | A1 | 2/2011 | Shin et al. |
| 2011/0105173 | A1 | 5/2011 | Haim et al. |
| 2011/0292874 | A1 | 12/2011 | Ho et al. |
| 2012/0039205 | A1 | 2/2012 | Kogure et al. |
| 2012/0044882 | A1 | 2/2012 | Kim et al. |
| 2012/0082043 | A1 | 4/2012 | Hwang et al. |
| 2012/0083308 | A1 | 4/2012 | Wang et al. |
| 2012/0087317 | A1 | 4/2012 | Bostrom et al. |
| 2012/0224552 | A1 | 9/2012 | Feuersanger et al. |
| 2012/0302173 | A1 | 11/2012 | Bostrom et al. |
| 2013/0089050 | A1 | 4/2013 | Heo et al. |
| 2013/0121203 | A1 | 5/2013 | Jung et al. |
| 2013/0215849 | A1 | 8/2013 | Heo et al. |

FOREIGN PATENT DOCUMENTS

| | | |
|---|---|---|
| JP | 2012-80540 A | 4/2012 |
| JP | 2013-533673 A | 8/2013 |
| JP | 2013-541251 A | 11/2013 |
| JP | 2013-541283 A | 11/2013 |
| KR | 10-2008-0047406 A | 5/2008 |
| KR | 10-2009-0083418 A | 8/2009 |
| KR | 10-2010-0106246 A | 10/2010 |
| WO | 2007/066902 A2 | 6/2007 |
| WO | 2010/065759 A2 | 6/2010 |
| WO | 2012/056273 A1 | 5/2012 |

OTHER PUBLICATIONS

Samsung, Discussion on PHR Format, 3GPP TSG-RAN2#72 meeting Tdoc R2-106509, Nov. 15-19, 2010, pp. 1-5, http://www.3gpp.org/ftp/tsg_ran/WG2_RL2/TSGR2_72/Docs/R2-106509.zip.

Samsung, Transmission Power & PHR Handing in CA, 3GPP TSG-RAN2#70 Meeting Tdoc R2-103550, Jun. 28-Jul. 2, 2010, pp. 1-7.

Mediatek, Further details for Rel-10 PHR, 3GPP TSG-RAN WG2 Meeting #71bis, R2-1054,14, Oct. 5, 2010, Xi'an, China.

Ericsson et al., Further discussion on PHR for carrier aggregation, 3GPP TSG-RAN WG1 #62bis, R1-105316, Oct. 5, 2010, Xi'an, China.

Huawei, Power Headroom Report Enhancement for CA, 3GPP TSG RAN WG1 meeting #62, R1-104493, Madrid, Spain, Aug. 17, 2010.

"LG Eletronics", Power Headroom Report in Carrier Aggregation, TSG-RAN WG1 Meeting #62, R1-104761, 6.2.3, Aug. 23-27, 2010, Madrid, Spain.

Ericsson et al., "WF on PHR reference formats", 3GPP Draft, R1-105802, PHR Reference Formats, 3rd Generation Partnership Project(3GPP), Mobile Competence Centre 650, Route Des Lucioles, F-06921, Sophia-Antipolis Cedex, France, vol. RAN WG1,#62bis, Xi'an, China; Oct. 11-15, 2010, XP050598837.

* cited by examiner

UPLINK SCHEDULING APPARATUS AND METHOD BASED ON UPLINK REPORT IN WIRELESS COMMUNICATION SYSTEM

CROSS-REFERENCE TO RELATED APPLICATION(S)

This application is a continuation application of prior application Ser. No. 15/720,678, filed on Sep. 29, 2017, which has issued as U.S. Pat. No. 10,231,195 on Mar. 12, 2019 and is a continuation application of prior U.S. application Ser. No. 15/278,524, filed on Sep. 28, 2016, which has issued as U.S. Pat. No. 9,788,285 on Oct. 10, 2017 and is a continuation application of prior U.S. application Ser. No. 13/288,305, filed on Nov. 3, 2011, which has issued as U.S. Pat. No. 9,461,805 on Oct. 4, 2016 and claimed the benefit under 35 U.S.C. § 119(a) of a Korean patent application number 10-2010-0109664, filed on Nov. 5, 2010 in the Korean Intellectual Property Office and of a Korean patent application number 10-2010-0116958, filed on Nov. 23, 2010 in the Korean Intellectual Property Office, the disclosure of which is incorporated by reference herein in its entirety.

BACKGROUND OF THE INVENTION

1. Field of the Invention

The present invention relates to mobile communications. More particularly, the present invention relates to a method and apparatus for scheduling uplink transmissions based on a maximum transmission power and a power headroom reported by a User Equipment (UE).

2. Description of the Related Art

Mobile communication systems have been developed to provide subscribers with voice communication services while on the move using wireless communication services. With the rapid advancement of technologies, the mobile communication systems have evolved to support high speed data communication services as well as the standard voice communication services.

Recently, the next generation mobile communication system of the $3^{rd}$ Generation Partnership Project (3GPP), Long Term Evolution (LTE) system is being developed. The LTE system realizes high-speed packet-based communication at about 100 Mbps. Regarding commercialization of the LTE system, a discussion is being held regarding two schemes of the LTE system: one scheme for reducing a number of nodes located in a communication path by simplifying a configuration of a network, and another scheme for maximally approximating wireless protocols to wireless channels.

Unlike voice service, in providing data service a resource is allocated according to an amount of data to be transmitted and a channel condition. Accordingly, in the wireless communication system, such as a cellular communication system, a scheduler manages resource allocation in consideration of the resource amount, the channel condition, and the amount of data to be transmitted. This is also the case in the LTE system as one of the next generation mobile communication systems such that the scheduler located in a base station manages and allocates the radio resources used by the LTE system.

Typically, the UE transmits scheduling information to an evolved Node B (eNB) for uplink scheduling in the LTE system. The scheduling information includes a Buffer Status Report (BSR) and a Power Headroom Report (PHR). The PHR is used, when the eNB assigns resources the UE, to limit the transmit power of the UE to a maxim transmission power. If the PHR is not accurate, it is difficult for the eNB to assign and schedule resources effectively and the inaccurate PHR may cause interference with other transmissions and thus it is beneficial for the eNB to have the ability to precisely interpret the PHR reported by the UE.

SUMMARY OF THE INVENTION

Aspects of the present invention are to address at least the above-mentioned problems and/or disadvantages and to provide at least the advantages described below. Accordingly, an aspect of the present invention is to provide a method, apparatus, and system for processing the scheduling information efficiently in a mobile communication system.

Another aspect of the present invention is to provide a method, apparatus, and system for processing the scheduling information between a User Equipment (UE) and an evolved NodeB (eNB) efficiently.

Another aspect of the present invention is to provide a method, apparatus, and system for reporting power headroom and maximum transmission power of a UE efficiently in a mobile communication system.

In accordance with an aspect of the present invention, a method for reporting Power Headrooms (PHs) for carriers of a terminal in a mobile communication system supporting carrier aggregation is provided. The method includes containing the PHs with indicators in an extended Power Headroom Report (PHR), the indicator indicating whether the PH is based on a real transmission on an uplink data channel, and containing, if the PH is based on the real transmission on the uplink data channel, a maximum transmission power used for calculation of the PH in the extended PHR.

In accordance with another aspect of the present invention, an apparatus for reporting Power Headrooms (PHs) for carriers used by a terminal in a mobile communication system supporting carrier aggregation is provided. The apparatus includes a power calculator for calculating the PHs, and a controller for containing the PHs with indicators in an extended Power Headroom Report (PHR), the indicator indicating whether the PH is based on a real transmission on an uplink data channel, and for containing, if the PH is based on the real transmission on the uplink data channel, a maximum transmission power used for calculation of the PH in the extended PHR.

In accordance with another aspect of the present invention, a method for receiving Power Headrooms (PHs) for carriers of a base station in a mobile communication system supporting carrier aggregation is provided. The method includes determining the PHs with indicators in an extended Power Headroom Report (PHR), the indicator indicating whether the PH is based on a real transmission on an uplink data channel, and determining, if the PH is based on the real transmission on uplink data channel, a maximum transmission power used for calculation of the PH in the extended PHR.

In accordance with still another aspect of the present invention, an apparatus for receiving Power Headrooms (PHs) for carriers of a base station in a mobile communication system supporting carrier aggregation is provided. The apparatus includes a controller for determining the PHs with indicators in an extended Power Headroom Report (PHR), the indicator indicating whether the PH is based on a real transmission on an uplink data channel, and for determining, if the PH is based on the real transmission on uplink data channel, a maximum transmission power used for calculation of the PH in the extended PHR, and a scheduler for scheduling the uplink data channel according to the PHs and maximum transmission powers.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus for a User Equipment (UE), which may also be referred to as a terminal, to report its Power Headroom (PH) to facilitate uplink transmission through multiple uplink carriers in a mobile communication system supporting carrier aggregation. Particularly, exemplary embodiments of the present invention propose a method and apparatus for reporting the maximum transmission power and headroom of the UE while minimizing overhead.

Figure 1:
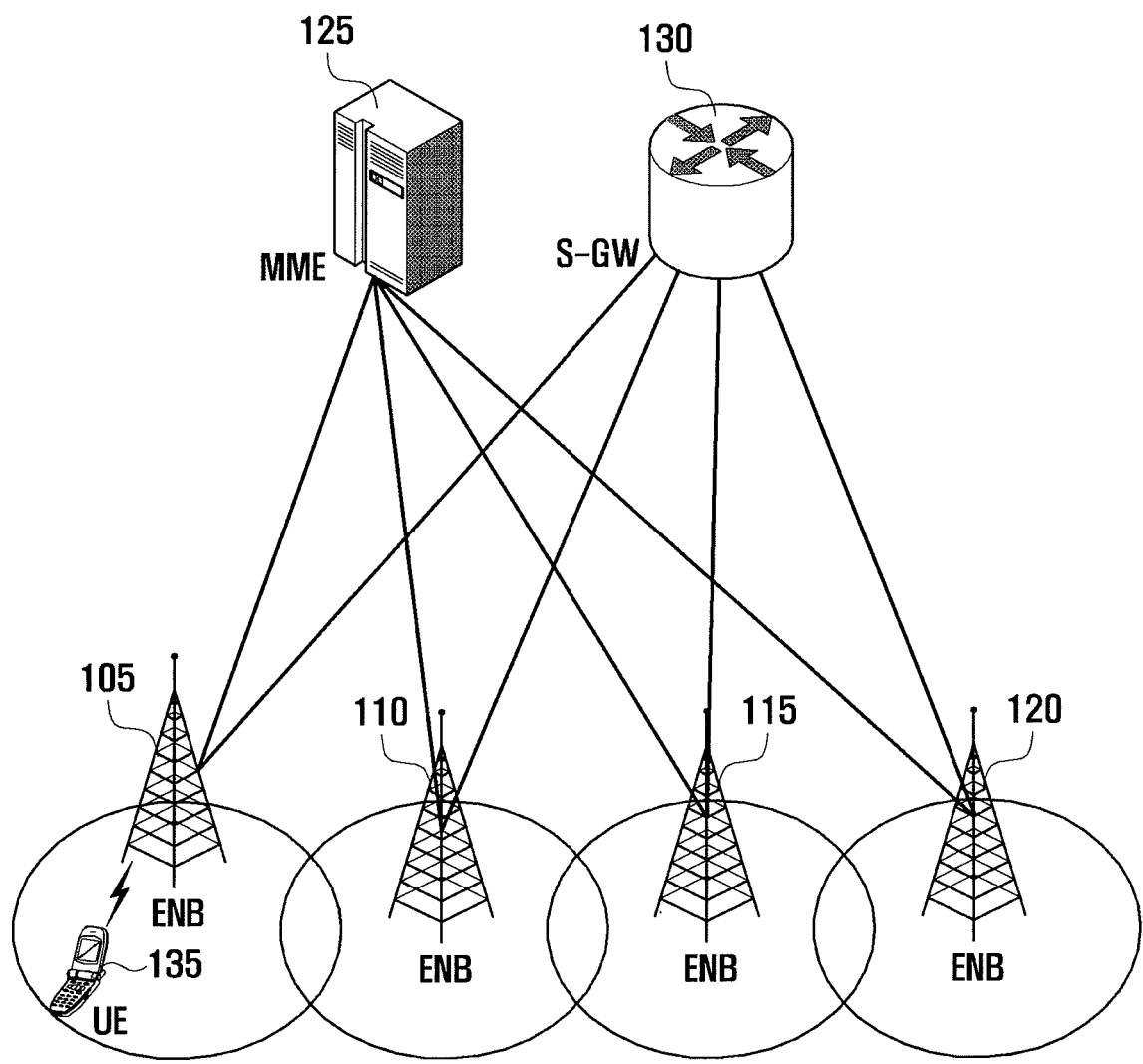
FIG. 1 is a diagram illustrating an architecture of a mobile communication system according to an exemplary embodiment of the present invention.

FIG. 1 is a diagram illustrating an architecture of a mobile communication system according to an exemplary embodiment of the present invention.

Referring to FIG. 1, a radio access network of the mobile communication system includes evolved Node Bs (eNBs) 105, 110, 115, and 120, a Mobility Management Entity (MME) 125, and a Serving-Gateway (S-GW) 130. The User Equipment (UE) 135, which may also be referred to as a terminal, connects to an external network via the eNBs 105, 110, 115, and 120 and the S-GW 130.

The eNBs 105, 110, 115, and 120 correspond to legacy node Bs of a Universal Mobile Telecommunications System (UMTS). The eNBs 105, 110, 115, and 120 allow the UE to establish a radio link and are responsible for more complicated functions, as compared to the legacy node B. In the LTE system, all the user traffic, including real time services such as Voice over Internet Protocol (VoIP), are provided through a shared channel. Thus there is a need for a device which is located in the eNB for scheduling data according to state information of the UEs.

In order to secure a data rate of up to 100 Mbps, the Long Term Evolution (LTE) system adopts Orthogonal Frequency Division Multiplexing (OFDM) as a radio access technology. Also, the LTE system adopts Adaptive Modulation and Coding (AMC) to determine a modulation scheme and a channel coding rate in adaptation to the channel condition of the UE. S-GW 130 is an entity for providing data bearers so as to establish and release data bearers under the control of the MME 125. MME 125 provides various control functions and is connected to a plurality of eNBs 105, 110, 115, and 120.

Figure 2:
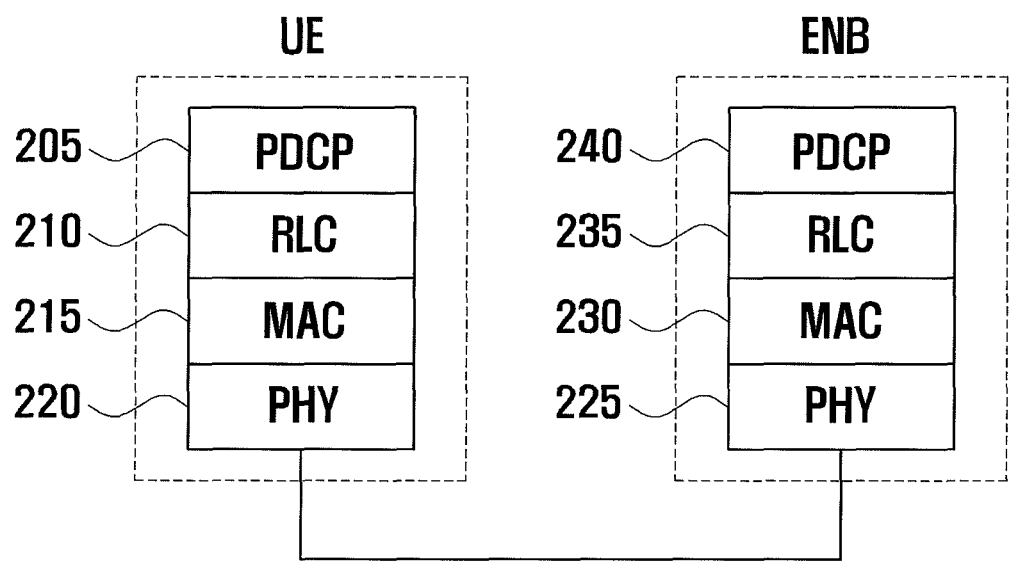
FIG. 2 is a diagram illustrating a protocol stack of a mobile communication system according to an exemplary embodiment of the present invention.

FIG. 2 is a diagram illustrating a protocol stack of a mobile communication system according to an exemplary embodiment of the present invention.

Referring to FIG. 2, the protocol stack of the mobile communication system, which is an LTE system, includes Packet Data Convergence Protocol (PDCP) layer 205 and 240, Radio Link Control (RLC) layer 210 and 235, Medium Access Control (MAC) layer 215 and 230, and Physical (PHY) layer 220 and 225. The PDCP layer 205 and 240 is responsible for Internet Protocol (IP) header compression/decompression. The RLC layer 210 and 235 is responsible for segmenting a PDCP Protocol Data Unit (PDU) into segments of appropriate size for Automatic Repeat Request (ARQ) operations. The MAC layer 215 and 230 is responsible for establishing a connection to a plurality of RLC entities so as to multiplex the RLC PDUs into MAC PDUs and demultiplex the MAC PDUs into RLC PDUs. The PHY layer 220 and 225 performs channel coding on the MAC PDU and modulates the MAC PDU into OFDM symbols in order to transmit the OFDM symbols over a radio channel or performs demodulating and channel-decoding on received OFDM symbols and delivers the decoded data to a higher layer.

Figure 3:
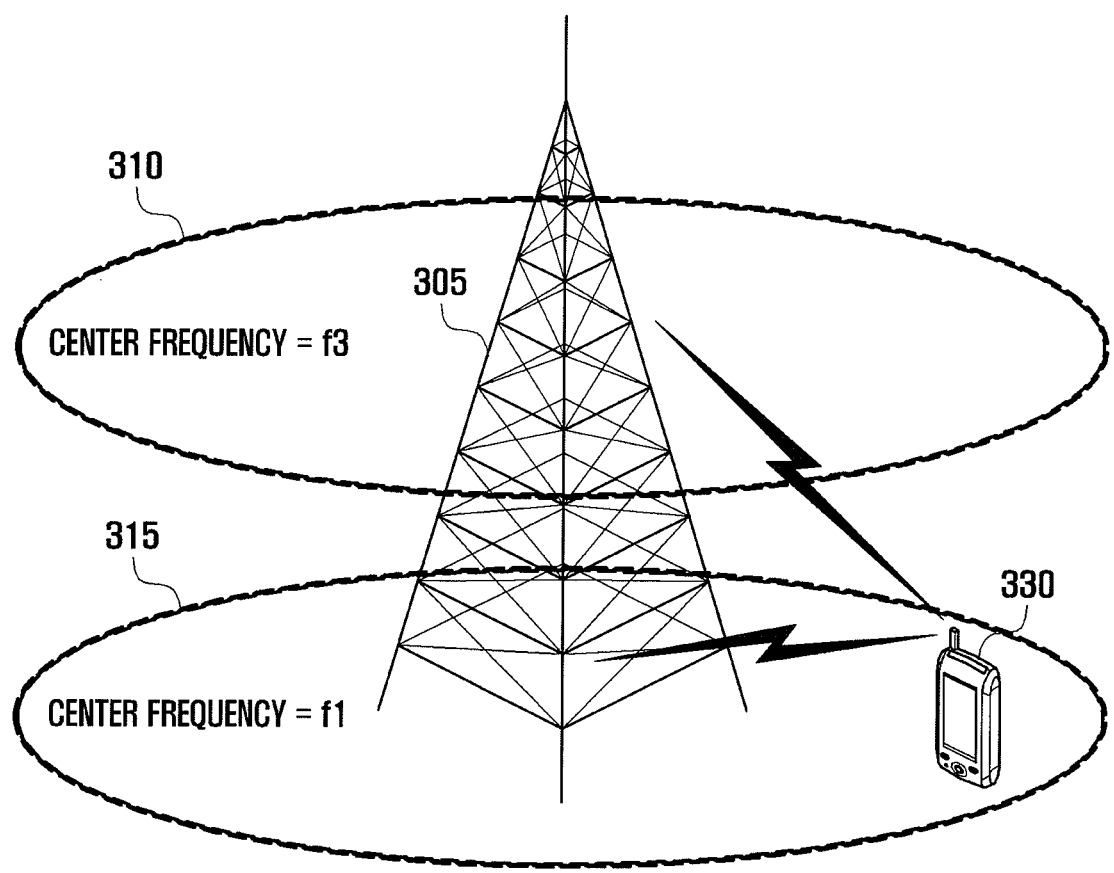
FIG. 3 is a diagram illustrating an exemplary situation of carrier aggregation in a mobile communication system according to an exemplary embodiment of the present invention.

FIG. 3 is a diagram illustrating an exemplary situation of carrier aggregation in a mobile communication system according to an exemplary embodiment of the present invention.

Referring to FIG. 3, typically an eNB can use multiple carriers for transmitting and receiving in different frequency bands. For example, an eNB 305 can be configured to use a carrier 315 with a center frequency f1 and a carrier 310 with a center frequency f3. If carrier aggregation is not supported, a UE 330 has to transmit/receive data using only one of the carriers 310 and 315. However, the UE 330 having the carrier aggregation capability can transmit/receive data using both the carriers 310 and 315.

An eNB can increase an amount of resources allocated to a UE having the carrier aggregation capability according to a channel condition of the UE so as to improve a data rate of the UE. In a case where a cell is configured with one downlink carrier and one uplink carrier, the carrier aggregation can be understood to be as if the UE communicates data via multiple cells. With the use of carrier aggregation, the maximum data rate increases in proportion to the number of aggregated carriers.

In the following description of the present exemplary embodiments, the phrase "the UE receives data through a certain downlink carrier or transmits data through a certain uplink carrier" means that the UE transmits or receives data through control and data channels provided in a cell corresponding to center frequencies and frequency bands of the downlink and uplink carriers. Although the description of the present exemplary embodiments is directed to an LTE mobile communication system, the present invention is not limited thereto and can be applied to other similar types of wireless communication systems supporting carrier aggregation.

When a UE uses a plurality of aggregated carriers, such a case may be understood as the UE having a plurality of serving cells. A cell or a service cell can be configured with downlink and uplink resources, and the uplink resource can exist depending on an uplink design. The service cells are categorized into Primary Cell (PCell) and Secondary Cell (SCell). The PCell is a cell that is always in an active state, and the SCell is a cell that is in one of the active and an inactive state under the control of the eNB. If a SCell is in the inactive state, then there is no data transmission/reception through the cell. In this case, the UE turns off the power to the parts related to the serving cell in inactive state in order to save power consumption. In the following descriptions of the exemplary embodiments, the term "cell" is used interchangeably with the term "serving cell."

In the LTE mobile communication system, in order to prevent the uplink transmission from interfering with transmissions in other frequency bands, the uplink transmission power is limited to an appropriate level. That is, spurious emissions, which are unintended transmissions on radio frequencies, should be reduced in order to fulfill a Spurious Emission Requirement. For this purpose, the UE calculates uplink transmission power with a predetermined function and performs an uplink transmission at the calculated uplink transmission power. For example, the UE calculates a request uplink transmission power value by inputting parameters, such as scheduling information, an allocated resource amount, a Modulation and Coding Scheme (MCS), and path loss, for estimating a status or a condition of a channel, and then performs the uplink transmission using the calculated request uplink transmission power value. The uplink transmission power of the UE is limited to the maximum transmission power of the UE and, if the calculated transmission power is greater than the maximum transmission power of the UE, the UE performs the uplink transmission with the maximum transmission power rather than the calculated transmission power. In this case, since the uplink transmission is performed with a power less than the calculated transmission power, a degradation of uplink transmission quality may result.

Accordingly, in order to avoid the degradation of the uplink transmission quality, the eNB performs scheduling such that the requested transmission power does not exceed the maximum transmission power. However, some parameters such as path loss cannot be determined by the eNB, and thus, the UE provides a report on its Power Headroom (PH) to the eNB by transmitting a Power Headroom Report (PHR) message. The PH is the difference between the maximum transmission power ($P_{CMAX}$) and the requested uplink transmission power, which will be also referred to as a Physical Uplink Shared Channel (PUSCH) transmission power. $P_{CMAX}$ is a variable and determined by the UE according to the following equations and description.

$P_{CMAX}$ is a value selected between a minimum value and a maximum value as shown in formula (1):

$$P_{CMAX\_L} \leq P_{CMAX} \leq P_{CMAX\_H} \quad (1)$$

In formula (1), $P_{CMAX\_L}$ and $P_{CMAX\_H}$ are calculated by equations (2) and (3):

$$P_{CMAX\_L}=\text{MIN}\{P_{EMAX}-\Delta T_C, P_{PowerClass}-\text{MPR}-A-\text{MRP}-\Delta T_C\} \quad (2),$$

$$P_{CMAX\_H}=\text{MIN}\{P_{EMAX}, P_{PowerClass}\} \quad (3)$$

where $P_{EMAX}$, $\Delta T_C$, $P_{PowerClass}$, MPR, and A-MRP are specified in 3GPP Technical Specification (TS) 36.101 and can be summarized as follows. $P_{EMAX}$ denotes the maximum allowed UE output power in the current cell, as determined by the eNB. $P_{PowerClass}$ indicates a power class of the UE that denotes the maximum transmission power determined by physical properties of the UE. The power class of the UE is determined at the manufacturing stage, and the UE notifies the eNB of the power class through RRC signaling.

MPR, A-MPR, and $\Delta T_C$ are the parameters defining the threshold value that is used for adjusting the maximum transmission power in order to meet the predetermined spurious emission requirements. MPR is a value determined by the resource amount allocated to the UE (i.e., an amount of bandwidth allocated to the UE) and a modulation scheme. The value of MPR depends on an amount of a transmission resource and a modulation scheme, which are specified in table 6.2.3-1 of the 3GPP TS 36.101. A-MPR is a value determined by a frequency band used for uplink transmission, local characteristics, and an uplink bandwidth, and is defined in tables 6.2.4-1, 6.2.4-2, and 6.2.4-3 of the 3GPP TS 36.101. A-MPR is used for a frequency band that may be particularly sensitive to adjacent spurious emissions due to the local characteristics and frequency band characteristics. $\Delta T_C$ is the parameter for allowing additional transmission power adjustment in a case where uplink transmissions are at a frequency band edge. If the uplink transmission is performed in the lowest 4 MHz or the highest 4 MHz of a bandwidth of a certain frequency band, then the UE sets $\Delta T_C$ to 1.5 dB and, otherwise, sets $\Delta T_C$ to 0.

As shown in formula (1), since $P_{CMAX}$ is a value that the UE can set randomly between a maximum value and a minimum value, it may not be enough for the eNB to make scheduling decision only with the PH. For example, the UE reports a PH calculated with the $P_{CMAX}$ set to X, but if the eNB misinterprets the $P_{CMAX}$ as Y, then the scheduling decision will be made incorrectly. The problem of the incorrect scheduling decision can be worse when the eNB performs scheduling for a multicarrier transmission of the UE. Unlike the single carrier transmission, in which the eNB can allocate additional transmission power to the UE using the PH reported by the UE in spite of an incorrect $P_{CMAX}$, the eNB cannot calculate the PUSCH transmission power from the PH since the PH is just the difference between the unknown $P_{CMAX}$ and the PUSCH transmission power. The eNB cannot determine a total transmission power in a multicarrier transmission in a state where the PUSCH transmission powers of individual cells are not known. Accordingly, in order to perform scheduling for the multicarrier uplink transmissions, the eNB is provided and uses the $P_{CMAX}$ as well as the PH.

In order to address the above problem, the present exemplary embodiments of the present invention provide a method for reporting the $P_{CMAX}$ along with the PH, wherein the $P_{CMAX}$ is used to calculate the PH. Since the $P_{CMAX}$ is reported so as to allow the eNB to interpret the PH correctly, it is of little use to transmit or report only the $P_{CMAX}$. Transmitting or reporting only the $P_{CMAX}$ also has a drawback in that a new MAC Control Element (CE) for transmitting control information of the MAC layer should be defined. In order to overcome this problem, the exemplary embodiments of the present invention provide a method for reporting the $P_{CMAX}$ in a PHR MAC CE. Also, in order to reduce the overhead for processing the $P_{CMAX}$ report, the UE reports the $P_{CMAX}$ only when a predetermined condition is fulfilled.

That is, the $P_{CMAX}$ is transmitted to the cells in which PHs are reported via the PHR only when the eNB cannot infer the $P_{CMAX}$. For example, there can be a case where the same $P_{CMAX}$ is configured in several cells and, in this case, the $P_{CMAX}$ is reported to only one of these cells. The same $P_{CMAX}$ can be set in the multiple cells when the cells are operating in the same frequency band. In this case, the same maximum transmission power reductions (MPR, A-MPR, and $\Delta T_C$) are applied, the same $P_{CMAX}$ is set for the cells. In the cells having no actual PUSCH transmission, the same $P_{CMAX}$ is applied for reasons to be described later.

Here, the PH is the difference between the $P_{CMAX}$ and the PUSCH transmission power. Accordingly, the PH for the cell having no PUSCH transmission is not calculated. However, since the eNB may schedule a PUSCH transmission in a cell that has no PUSCH transmission currently to occur in the near future, it is necessary to report the PH for the cell having no PUSCH transmission currently. In the exemplary embodiments of the present invention, the PH for the cell having no current PUSCH transmission is calculated using a predetermined transmission format. Since the purpose of the PH report for the cell having no current PUSCH transmission is to trace a variation of a path loss of the cell or a variation of accumulated values of transmission power control commands, the $P_{CMAX}$ is less important in such a case. In the exemplary embodiments of the present invention, the $P_{CMAX}$ of the cell having no current PUSCH transmission is a predetermined value, and thus, is not transmitted and is not determined according to a $P_{CMAX}$ report for the cells, thereby reducing overhead of the eNB.

In the exemplary embodiments of the present invention, one of two reserved bits of the PH, the reserved bit being referred to as a P bit, is used for the $P_{CMAX}$ report in a certain cell in order to indicate whether the $P_{CMAX}$ is reported or not. The other bit of the two reserved bits, the other bit being referred to as an V bit, is used to indicate whether the PH is calculated based on the actual PUSCH transmission.

Figure 4:
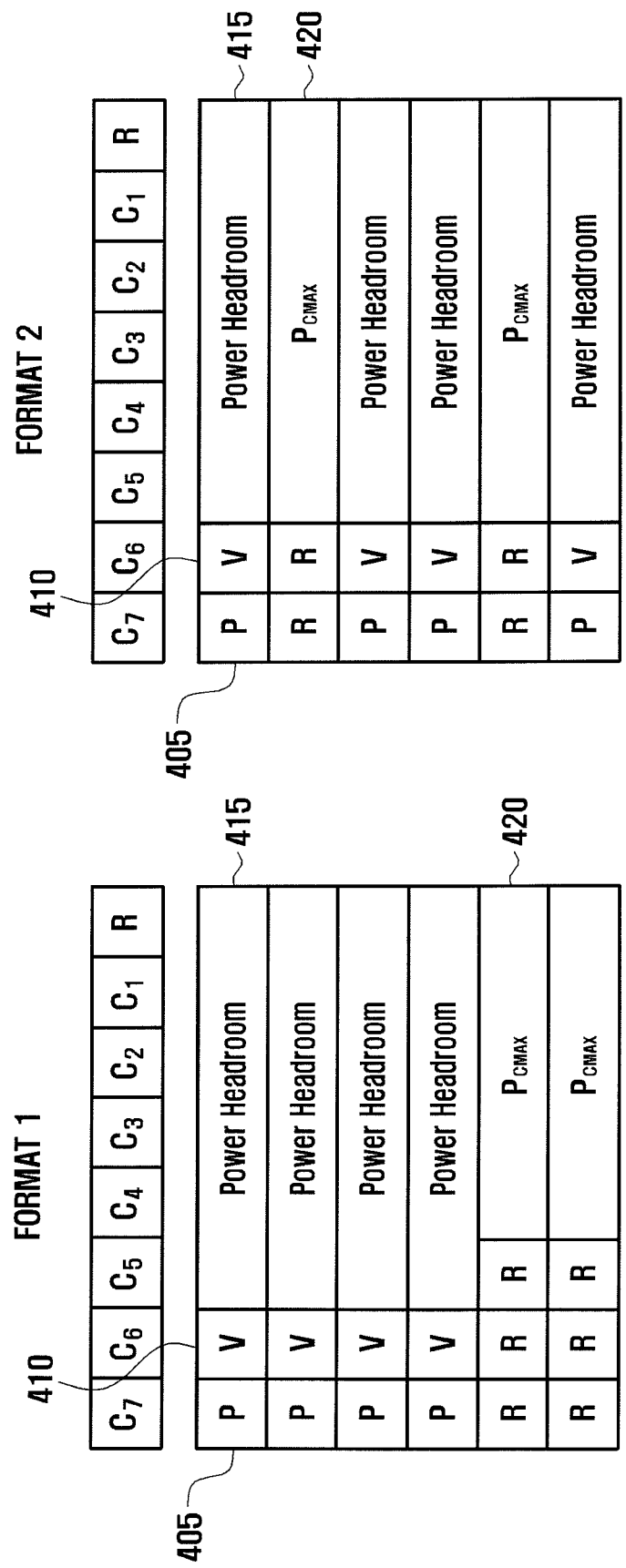
FIG. 4 is a diagram illustrating formats of payload of Power Headroom Report (PHR) Medium Access Control (MAC) Control Element (CE) according to an exemplary embodiment of the present invention.

FIG. 4 is a diagram illustrating formats of payload of extended PHR MAC CE according to the first exemplary embodiment of the present invention.

Referring to FIG. 4, the PHR includes PH information 415 and $P_{CMAX}$ information 420 for a plurality of cells. The PH information 415 and $P_{CMAX}$ information 420 for one cell can be disposed at a distance from each other in the payload, as shown in Format 1, or may be disposed adjacent to each other in the payload, as shown in Format 2. In the PH information 415 for a certain cell, a P bit 405 indicates whether the PHR includes a $P_{CMAX}$ for the corresponding cell, and an V bit 410 indicates whether the PH information 415 is calculated based on the actual PUSCH transmission. The P bit 405 being set to 0 indicates that the PHR includes the $P_{CMAX}$ for the corresponding cell, and the $P_{CMAX}$ information 420 can be arranged at an appropriate position in the payload according to an arrangement order of the cells, as shown in Format 1. Alternatively, the information $P_{CMAX}$ 420 can be disposed to be right after the PH information of the corresponding cell, as shown in Format 2. If the P bit 405 is set to 1, this indicates that the PHR includes no $P_{CMAX}$ for the corresponding cell and the $P_{CMAX}$ for the corresponding cell is set to a predetermined value, for example, the V bit 410 is set to 1, and is identical with the $P_{CMAX}$ of other cells. In other words, the PH information 415 is not associated with actual PUSCH transmission and thus a predetermined value of $P_{CMAX}$ is used.

Figure 5:
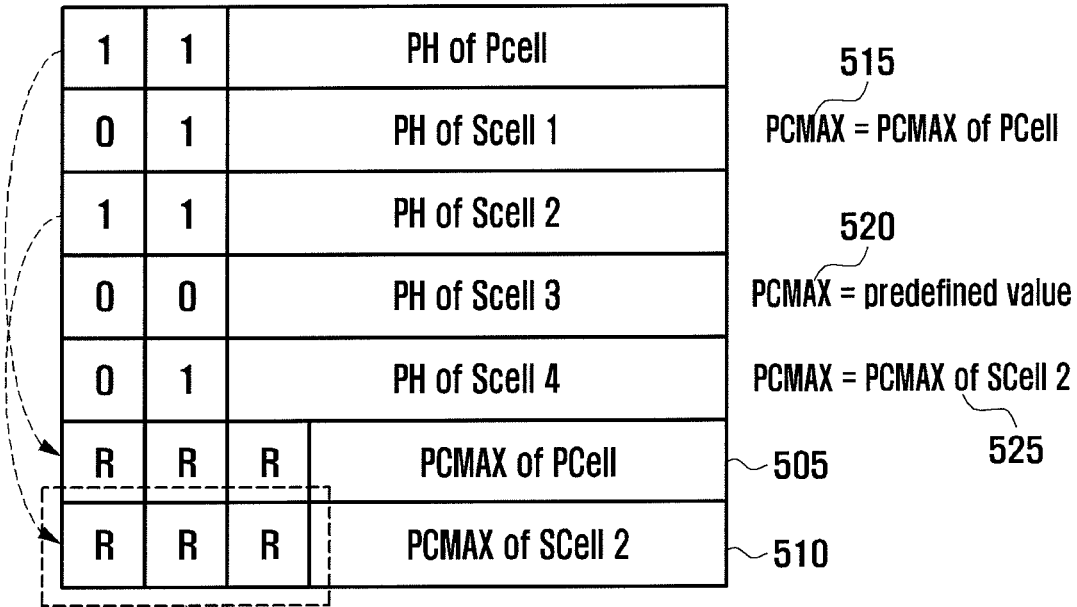
FIG. 5 is a diagram illustrating an exemplary information format for reporting a Power Headroom (PH) and $P_{CMAX}$ according to an exemplary embodiment of the present invention.

FIG. 5 is a diagram illustrating an exemplary information format for reporting a PH and a $P_{CMAX}$ according to an exemplary embodiment of the present invention.

Referring to FIG. 5, the PHR includes the PH information for a PCell, a SCell 1, a SCell 2, a SCell 3, and a SCell 4. For the purpose of convenience, the PHR of FIG. 5 is depicted in Format 1 of FIG. 4. Here, the SCell 3 does not include a PUSCH transmission, and the other cells include PUSCH transmissions. The $P_{CMAX}$ of the SCell 1 is equal to the $P_{CMAX}$ of the PCell, and the $P_{CMAX}$ of the SCell 2 is equal to the $P_{CMAX}$ of the SCell 4. Here, the PH information is arranged such that the PH information of the PCell is followed by the PH information of the SCells in a sequential manner. That is, the PH information is arranged according to an order of PCell, SCell 1, SCell 2, SCell 3, and SCell 4. The $P_{CMAX}$ is transmitted in the cell at the start of the list or in the cell having the lowest cell index from among the cells for which the same $P_{CMAX}$ is set. That is, from among the PCell, the SCell 1, the SCell 2, the SCell 3, and the SCell 4, the $P_{CMAX}$ is transmitted in the PCell and the SCell 1.

That is, the UE sets the P bits to be 0 for the PH information for the cells in which the $P_{CMAX}$ is reported, and sets the P bits to be 1 for the PH information for the rest of the cells. For the cells in which $P_{CMAX}$ is not reported, $P_{CMAX}$ information 515 and 525 for the cells in which the PHs are calculated according to the actual PUSCH transmission (i.e., the SCell 1 and the SCell 2) are equal to the $P_{CMAX}$ information 505 and 510. The $P_{CMAX}$ information 505 and 510 is for the cells for which the PHs are arranged prior to the cells in which $P_{CMAX}$ information are reported, and are the closest cells or cells that have a low cell index and are closest, i.e., the $P_{CMAX}$ information 505 and 510 of the PCell and SCell. In a case of the SCell 1, since the PCell fulfills the above described conditions for the cells in which $P_{CMAX}$ is reported (i.e., the cell index of the PCell is 0), the $P_{CMAX}$ 515 of the SCell 1 is equal to the $P_{CMAX}$ 505 of the PCell. Likewise, the $P_{CMAX}$ 525 of the SCell 4 is equal to the $P_{CMAX}$ 510 of the SCell 2. Among the cells in which the $P_{CMAX}$ is not reported, such as the cell for which the PH is calculated according to the virtual transmission format other than actual PUSCH transmission, i.e., the SCell 3, which is the cell with V bit set to 1, the $P_{CMAX}$ 520 is set to a predetermined value. The predetermined value can be $P_{CMAX\_H}$.

Although, as shown in FIGS. 4 and 5, it is assumed that the size of the $P_{CMAX}$ information is 5 bits or 6 bits, the present invention is not limited thereto, and the size of the $P_{CMAX}$ information can be greater than or less than 5 bits. The $P_{CMAX}$ information can be expressed in a format indicating the maximum value of $P_{CMAX}$, i.e., the power reduction in $P_{CMAX\_H}$. For example, the index of $P_{CMAX}$ is set to 0 for indicating that the $P_{CMAX}$ equal to $P_{CMAX\_H}$ or is set to 1 for indicating a value that is reduced by as much as 1 dB from the $P_{CMAX\_H}$. In this case, it is possible, with 5 bits, to express the $P_{CMAX}$ obtained by a reduction of up to as much as 31 dB from the $P_{CMAX}$ H, and 5 bits can be an appropriate length for the size of the $P_{CMAX}$ information in consideration of there being a high probability of no power reduction over 31 dB. One of three reserved bits 530 of the $P_{CMAX}$ information can be used to indicate that a larger power reduction is applied to the $P_{CMAX}$ due to the simultaneous transmission of another radio technology. If another radio technology, e.g., a CDMA2000 system, is used simultaneously along with the LTE system, then the transmission power of the LTE system can be further limited with a notification sent to the eNB scheduler, such that the eNB can perform scheduling efficiently.

Figure 6:
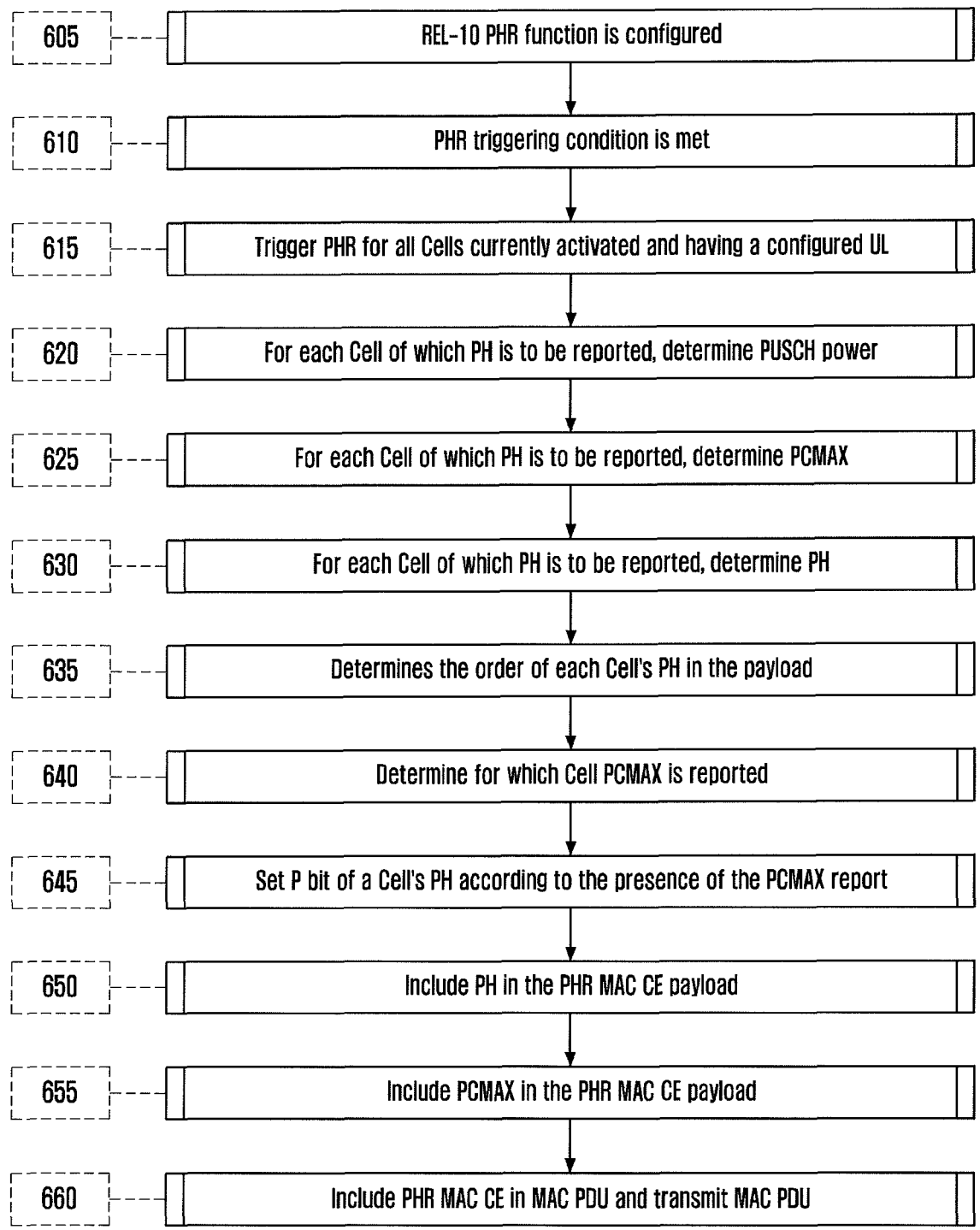
FIG. 6 is a flowchart illustrating a User Equipment (UE) procedure for uplink scheduling method according to an exemplary embodiment of the present invention.

FIG. 6 is a flowchart illustrating a UE procedure for uplink scheduling method according to an exemplary embodiment of the present invention.

Referring to FIG. 6, the UE configures a Release-10 (REL-10) PHR function in step 605. The REL-10 PHR function differs from the Release-8 (REL-8) PHR function as per a format and a type of information reported. The REL-10 PHR function can be configured through RRC control message signaling for activation of REL-10 techniques, such as carrier aggregation. After step 605, the UE waits until PHR generation conditions are fulfilled while performing a predetermined operation. The PHR generation conditions are fulfilled when there are transmission resources available for a new uplink transmission, a timer restricting PHR transmission has expired (or is currently running), and the path loss of at least one cell, from among the cells fulfilling a predetermined condition, is changed so as to be over a predetermined threshold value. Here, the cell fulfilling the predetermined condition can be the cell reporting the power headroom from among the cells in an active state, e.g., the cell for which uplink resource is configured.

If the PHR generation conditions are fulfilled, or met, at step 610, then the UE triggers a PHR process for reporting PHs for the cells configured with uplink resources from among the currently active cells in step 615. Next, the UE calculates PUSCH transmission powers for the PHR-triggered cells or for cells for which PHs are reported, using equation (4) in step 620:

$$\text{PUSCH power}=10\log_{10}(M_{PUSCH}(i))+P_{O\_PUSCH}(j)+\alpha(j)\cdot PL+\Delta_{TF}(i)+f(i) \quad (4)$$

where $M_{PUSCH}(i)$ denotes a value determined by a number of assigned transmission resources, $P_{O\_PUSCH}(j)$ denotes the sum of the offsets defined per cell and the offsets defined per UE, PL denotes the path loss, $\alpha(j)$ denotes the coefficient defined per cell and multiplied with the path loss, $\Delta_{TF}(i)$ denotes the value determined by MSC level, and f(i) denotes the accumulated value of Transmission Power Control (TPC) command. Further discussion of the variable discussed above with respect to equation (4) may be found in the 3GPP TS 36.213.

When calculating the PH for the cell in which the PUSCH is transmitted in a subframe carrying the PHR, the value for the actual PUSCH transmission is the PUSCH transmission parameter, which is the number of scheduled transmission resource blocks and a MCS level. In equation (4), the PL refers to the path loss of downlink resources of the cell in association with the uplink resources of the cell for which PH is calculated, and the f(i) refers to the accumulated value of the TPC command related to the PUSCH transmission of the cell for which PH is calculated.

Meanwhile, when calculating the PH of the cell having no PUSCH transmission in the subframe carrying the PHR, a predetermined value is used as the PUSCH transmission parameter. For example, both the $10\log_{10}$ and $\Delta_{TF}(i)$ can be set to be 0. The PL and the f(i) are set in a manner similar to the case where the PUSCH transmission exists in the subframe carrying the PHR. For the purpose of convenience, the method for calculating the PH of the cell having the PUSCH transmission in the subframe carrying the PHR is referred to as a PH calculation scheme 1, and the method for calculating the PH of the cell having no PUSCH transmission in the subframe carrying PHR is referred to as a PH calculation scheme 2.

Next, the UE determines a $P_{CMAX}$ for each cell in which the PH is reported in step 625. As described above, the UE sets the $P_{CMAX}$ for the cell having no transmission in the subframe carrying the PHR to a predetermined value. The UE determines the $P_{CMAX}$ such that the PUSCH transmission power fulfills the spurious emission requirement for the cell having a transmission in the subframe carrying the PHR.

Next, in step 630, the UE calculates the PHs for the cells that are PHR-triggered or for the cells for which PHs are reported. The PH is the difference between the $P_{CMAX}$ determined at step 625 and the PUSCH transmission power calculated at step 620. Next, the UE determines the arrangement order of the PHs for the cells in the payload of the PHR MAC CE in step 635. For example, the UE can arrange the PHs in ascending order according to the cell index. Next, the UE determines the cells for which the $P_{CMAX}$ is reported and the cells for which no $P_{CMAX}$ information is reported from among the cells for which PH is reported. At this time, the UE always reports the $P_{CMAX}$ for the PCell and reports the $P_{CMAX}$ for the rest cells only when the following conditions are not met. The below conditions are referred to as $P_{CMAX}$ report skip conditions.

The first $P_{CMAX}$ report skip condition is to skip the $P_{CMAX}$ report when the $P_{CMAX}$ of a certain cell is equal to the $P_{CMAX}$ of the cell proceeding the current cell in the PH reporting order from among the cells for which $P_{CMAX}$ is reported, or, otherwise, to perform the $P_{CMAX}$ report. The second $P_{CMAX}$ report skip condition is to skip the $P_{CMAX}$ report when the PH of a certain cell is calculated with the PH calculation scheme 1 and, otherwise, to perform the $P_{CMAX}$ report when the PH is calculated with the PH calculation scheme 2. The third $P_{CMAX}$ report skip condition is to skip the $P_{CMAX}$ report when one of the first and second $P_{CMAX}$ report skip conditions is fulfilled and to perform the $P_{CMAX}$ report when both the first and second $P_{CMAX}$ report skip conditions are not fulfilled. The fourth $P_{CMAX}$ report skip condition is to skip the $P_{CMAX}$ report when the PH of a certain cell is calculated with the PH calculation scheme 2 or the $P_{CMAX}$ for the corresponding cell is equal to the most recently reported $P_{CMAX}$ for the same cell, and to perform the $P_{CMAX}$ report when the PH of a certain cell is calculated with the PH calculation scheme 1 and the $P_{CMAX}$ for the corresponding cell is different from the most recently reported $P_{CMAX}$ for the same cell. According to the above conditions, it is determined, in step 640, for which cells the $P_{CMAX}$ is reported.

Next, the UE sets the P bit of each cell's PH to an appropriate value in step 645. For example, if the $P_{CMAX}$ is reported for the corresponding cell, the UE sets the P bit to 0 and, otherwise, if the $P_{CMAX}$ is not reported for the corresponding cell, the UE sets the P bit to 1. The UE also sets the V bit to an appropriate value in each cell. For example, if the PH for the corresponding cell is calculated with the PH calculation scheme 1, then the UE sets the V bit of each cell's PH to 0 and, otherwise if the PH for the corresponding cell is calculated with the PH calculation scheme 2, then the UE sets the V bit of each cell's PH to 1.

Next, in step 650, the UE arranges the PHs for the individual cells in the payload of the PHR in the order determined at step 635. Next, in step 655, the UE arranges the $P_{CMAX}$ information in the payload of the PHR in the PH arrangement order for the cells for which the $P_{CMAX}$ report is determined. Finally, the UE generates a MAC sub header of the PHR MAC CE and transmits a MAC PDU encapsulating the MAC sub header and payload in step 660.

Figure 7:
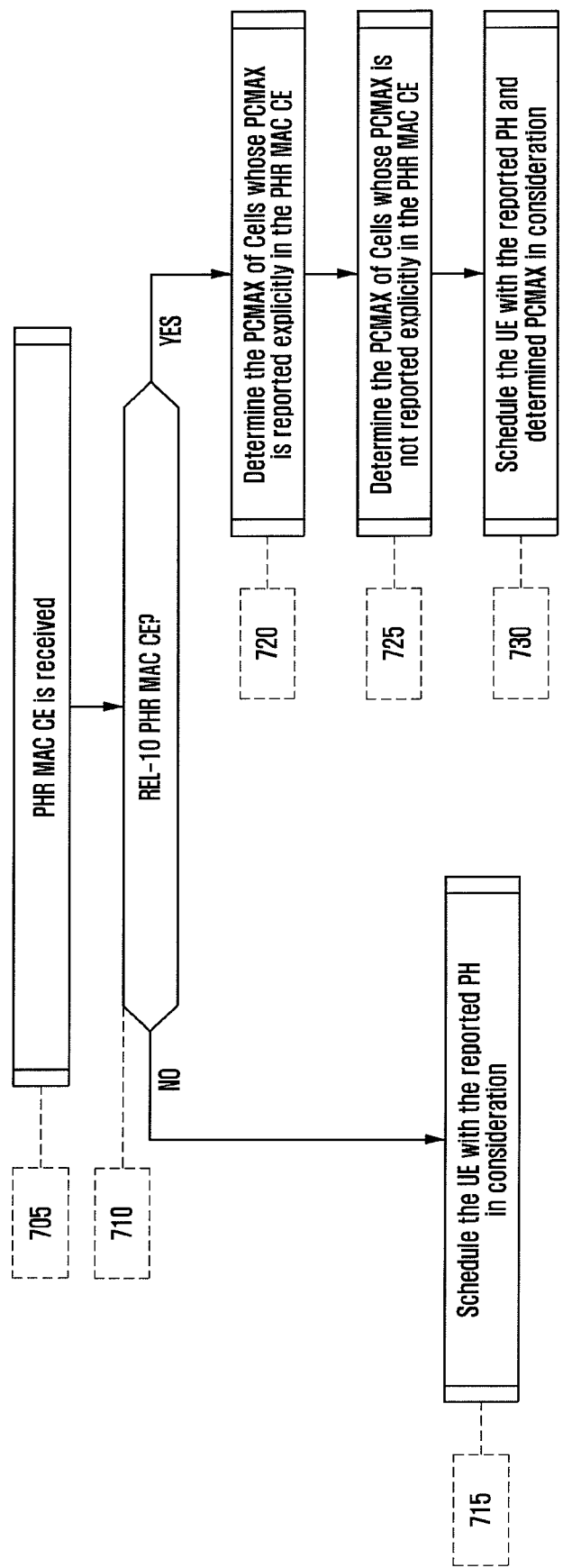
FIG. 7 is a flowchart illustrating an evolved Node B (eNB) procedure for uplink scheduling method according to an exemplary embodiment of present invention.

FIG. 7 is a flowchart illustrating an eNB procedure for an uplink scheduling method according to an exemplary embodiment of present invention.

Referring to FIG. 7, if a PHR MAC CE is received from the UE in step 705, then the eNB determines whether the PHR MAC CE is a REL-8 PHR MAC CE or REL-10 PHR MAC CE in step 710. If the PHR MAC CE is a REL-8 PHR MAC CE, then the eNB interprets the PH information included in the PHR MAC CE and schedules the UE in consideration of the PH so as to not cause a transmission power shortage problem in step 715. Otherwise, in step 720, if the PHR MAC CE is a REL-10 PHR MAC CE, then the eNB determines the $P_{CMAX}$ of the cells whose $P_{CMAX}$ is reported explicitly in the PHR MAC CE, i.e., the cells for which the P bit of the PH is set to 0. Next, in step 725, the eNB determines the $P_{CMAX}$ of the cell whose $P_{CMAX}$ is not reported in the PHR MAC CE, i.e., the cells for which the P bit of PH is set to 1.

At this time, from among the cells whose $P_{CMAX}$ is explicitly reported, the eNB determines the $P_{CMAX}$ of the cell preceding and closest to the cell for which the V bit is set to 0 in the PHR to be the $P_{CMAX}$ of the corresponding cell. The eNB also determines a predetermined $P_{CMAX}$, e.g., $P_{CMAX\_H}$, for the cell for which the V bit is set to 1 as being the $P_{CMAX}$ of the corresponding cell. Next, in step 730, the eNB interprets the PH information included in the PHR MAC CE and schedules the UE in consideration of the PH information and the $P_{CMAX}$ information so as to not cause a transmission power shortage.

Furthermore, the present exemplary embodiment of the present invention can be simplified such that, when the $P_{CMAX}$ information for the cells for which the P bit is not used and the V bit is set to 0 from among the cells for which the PH and one $P_{CMAX}$ is reported. Alternatively, individual $P_{CMAX}$ information for the cells for which the V bit is set to 0 are transmitted separately.

With respect to the UE, the simplified UE procedure is identical to that as depicted in FIG. 6 except for the following features. That is, the UE determines the cells for which $P_{CMAX}$ information is reported and the cells for which $P_{CMAX}$ information is not reported from among the cells for which PHs are reported. The UE does not report the $P_{CMAX}$ for the cells for which PHs are calculated using the PH calculation scheme 2, which are the cells having no uplink transmission or the cells using a predetermined format for calculating the PUSCH transmission power. The UE checks the $P_{CMAX}$ of the cells for which the PHs are calculated using the PH calculation scheme 1, which are the cells having an uplink transmission, i.e., the cells using the transmission format actually used for calculating the PUSCH transmission power. If the $P_{CMAX}$ information of all the cells are identical with each other, then the UE determines to include one $P_{CMAX}$. Accordingly, it is determined to report only the $P_{CMAX}$ of the PCell. If the $P_{CMAX}$ for at least one cell differs from the $P_{CMAX}$ for other cells, then it is determined to report $P_{CMAX}$ information for the respective cells that are calculated using the PH calculation scheme 1.

Referring to FIG. 6, in step 645, the UE sets the V bit to an appropriate value. For example, the V bit is set to 0 when the PH of the corresponding cell is calculated using the PH calculation scheme 1, and the V bit is set to 1 when the PH of the corresponding cell is calculated using the PH calculation scheme 2. In a case of using the simplified UE procedure, the P bit is not necessary. This is because the length of the PHR payload is indicated explicitly by an L field and, thus, the eNB can determine the number of cells for which the $P_{CMAX}$ is reported in the PHR payload by referencing the L field. Of course, it is possible to signal whether the $P_{CMAX}$ exists by using the P bit in order to reduce complexity at the eNB. In this case, the eNB sets both the P bit and the V bit at step 645. Since the rest steps of the in the simplified UE procedure are identical with those described above, detailed description thereof is omitted herein.

With respect to a simplified eNB procedure, except for the following features, the simplified eNB procedure is identical with the procedure depicted in FIG. 7. That is, the eNB determines the $P_{CMAX}$ for the cells for which the $P_{CMAX}$ is not explicitly reported. If one $P_{CMAX}$ is reported, then the eNB determines the $P_{CMAX}$ for all the cells for which the V bit is set to 0 as the reported by the $P_{CMAX}$. If multiple $P_{CMAX}$ information are reported, the eNB determines the $P_{CMAX}$ reported in PH-reporting order of the cells for which the V bit is set to 0. The eNB determines the $P_{CMAX}$ information for the cells for which the V bit is set to 1 as a predetermined value, e.g., $P_{CMAX\_H}$. Since the rest of the steps simplified eNB procedure are identical to those described above, detailed description thereof is omitted herein.

Figure 8:
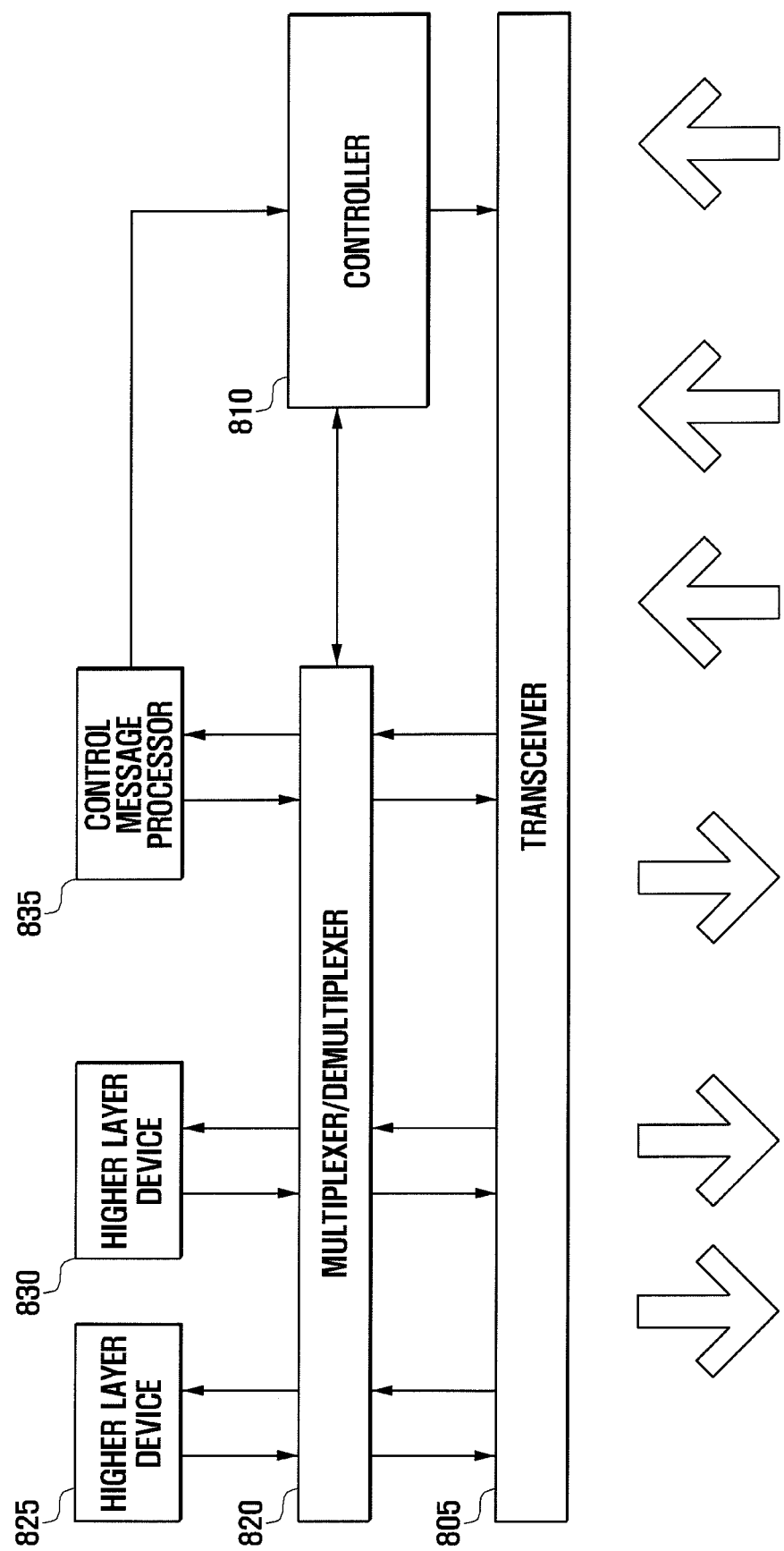
FIG. 8 is a block diagram illustrating a configuration of a UE according to an exemplary embodiment of the present invention.

FIG. 8 is a block diagram illustrating a configuration of a UE according to an exemplary embodiment of the present invention.

Referring to FIG. 8, the UE, according to the present exemplary embodiment, includes a transceiver 805, a controller 810, a multiplexer/demultiplexer 820, a control message processor 835, and a plurality higher layer devices 825 and 830.

The transceiver 805 receives data and control signals on a downlink carrier and transmits data and control signals on an uplink carrier. In a case where multiple carriers are configured, the transceiver 805 can transmit/receive the data and control signals on multiple subcarriers.

The multiplexer/demultiplexer 820 multiplexes the data generated by the higher layer devices 825 and 830 and/or the control message processor 835 and outputs the multiplexed signal to the transceiver 805. The multiplexer/demultiplexer 820 also demultiplexes the data received by the transceiver 805 and delivers the demultiplexed data to the higher layer devices 825 and 830, the control message processor 835, and or/the controller 810.

The control message processor 835 processes the control message transmitted via the network and takes an action in response to the control message. The control message processor 835 transfers a parameter (e.g., $P_{EMAX}$), which is included in the control message and which is necessary for determining $P_{CMAX}$, to the controller 810. The control message processor 835 also notifies the controller 810 of whether the REL-10 PHR is used.

The higher layer devices 825 and 830 are configured to be responsible for the respective services so as to process the data of user services, such as File Transfer Protocol (FTP) and VoIP, and deliver the processed data to the multiplexer/demultiplexer 820. The higher layer devices 825 and 830 process the data from the multiplexer/demultiplexer 820 and deliver the processed data to higher layer service applications.

The controller 810 analyses a scheduling command, e.g., an uplink grant, received through the transceiver 805 and controls the transceiver 805 and the multiplexer/demultiplexer 820 to perform uplink transmission using appropriate transmission resources at an appropriate time point. The controller 810 controls the $P_{CMAX}$ reporting process when a predetermined condition is fulfilled. For example, if the PHR is triggered in a state where the REL-10 PHR function is activated, the controller 810 then starts the $P_{CMAX}$ reporting process. At this time, the control unit 810 calculates the PHs for the cells in an active state and determines an arrangement order of the PHs in the payload of the PHR MAC CE. The controller 810 also determines the cells for which $P_{CMAX}$ is to be reported from among the cells for which the PH is reported, and then sets the P bit of each PH to an appropriate value depending on whether the $P_{CMAX}$ exists. The controller 810 transfers the payload of the PHR MAC CE to the multiplexer/demultiplexer 820.

Although not shown, the controller 801 includes a power calculator and a report processor. The power calculator calculates a PUSCH transmission power requested for each cell, determines a $P_{CMAX}$ per cell for the PUSCH transmission, and calculates a PH per cell based on the difference between the PUSCH transmission power and the $P_{CMAX}$. The report processor generates the PHR MAC CE including the $P_{CMAX}$ and the PH.

For this purpose, the report processor determines a position of each PH in the PHR MAC CE according to the priority order of the cells and places the PHs at their respective positions in the PHR MAC CE. The report processor also determines whether to encapsulate the $P_{CMAX}$ of each cell in the PHR MAC CE and, if it is determined to encapsulate the $P_{CMAX}$ of at least one cell, the report processor arranges the $P_{CMAX}$ of the at least one cell so as to follow the PH in the PHR MAC CE. Here, the PHR MAC CE is configured per cell and includes fields for indicating whether the PH and the $P_{CMAX}$ are carried and whether the PUSCH transmission occurs. The report processor also determines whether to perform the PUSCH transmission per cell and, if it is determined to perform the PUSCH transmission for at least one cell, encapsulates the $P_{CMAX}$ for the at least one cell while excluding the $P_{CMAX}$ for the rest cells.

Figure 9:
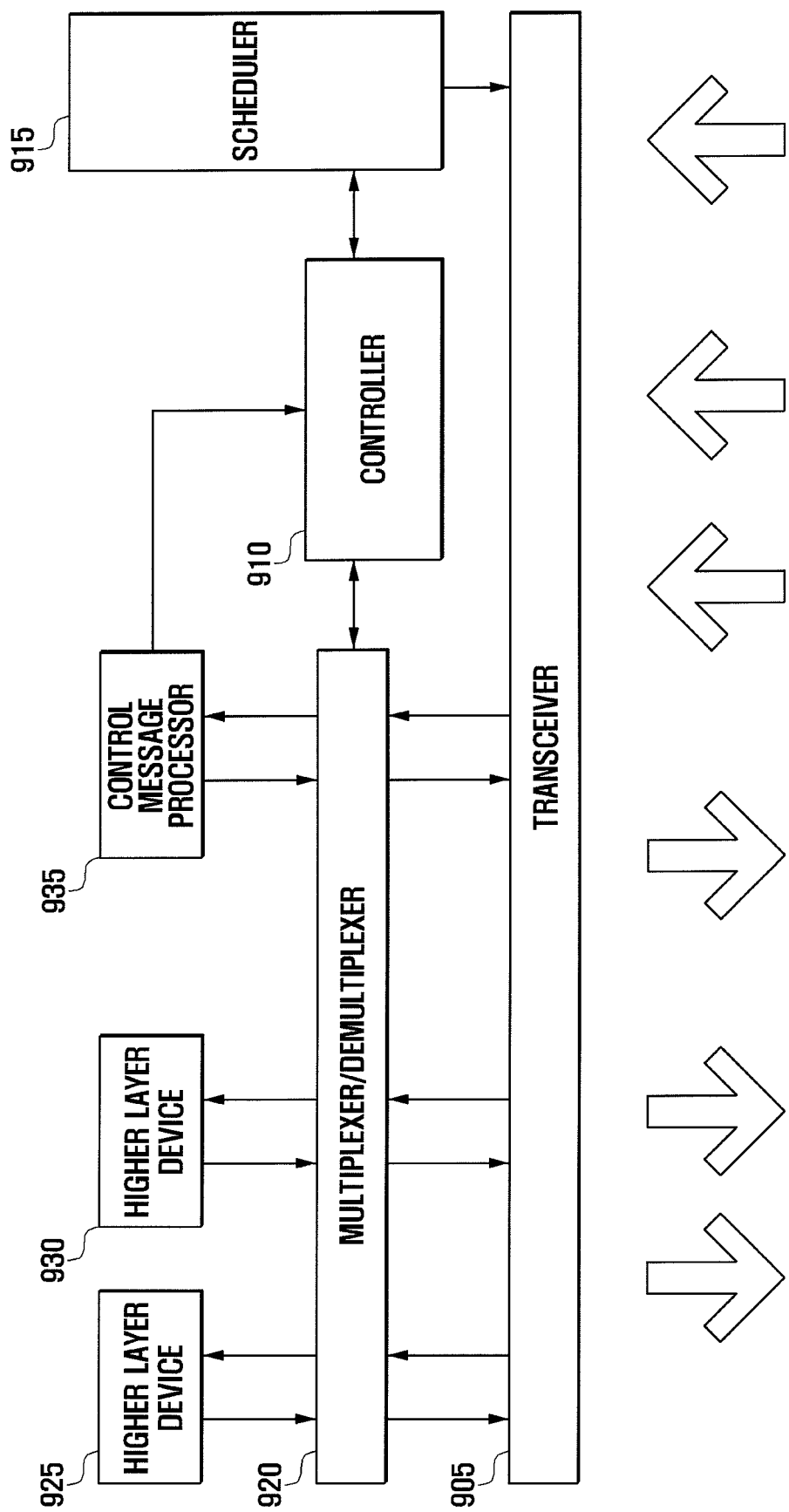
FIG. 9 is a block diagram illustrating a configuration of an eNB according to an exemplary embodiment of the present invention.

FIG. 9 is a block diagram illustrating a configuration of an eNB according to an exemplary embodiment of the present invention.

Referring to FIG. 9, the eNB includes a transceiver 905, a controller 910, a multiplexer/demultiplexer 920, a control message processor 935, a plurality of higher layer devices 925 and 930, and a scheduler 915.

The transceiver 905 transmits data and controls signals on a downlink carrier and receives data and control signals on an uplink carrier. In a case where multiple carriers are configured, the transceiver 905 can transmit/receive the data and control signals on the multiple carriers.

The multiplexer/demultiplexer 920 multiplexes the data generated by the higher layer devices 925 and 930 and/or the control message processor 935. The multiplexer/demultiplexer 920 also demultiplexes the data received from the transceiver 905 and delivers the demultiplexed data to the higher layer device 925 and 930, the control message processor 935, and/or the controller 910.

The control message processor 935 processes the control message transmitted by a UE and takes an action in response to the control message or generates a control message to be transmitted to a terminal, or UE, to lower layers of a communication protocol or lower layer devices. For example, the control message processor 935 transfers the P PowerClass information transmitted by the UE to the controller 910.

The higher layer devices 925 and 930 are configured to be responsible for respective user services so as to process the data of the user services, such as FTP and VoIP, and delivers the processed data to the multiplexer/demultiplexer 920. The higher layer devices 925 and 930 process the data from the multiplexer/demultiplexer 920 and deliver the processed data to higher layer service applications.

The controller 910 processes the PHR MAC CE transmitted by the UE, and transfers scheduling-related information to the scheduler 915. For example, the controller 910 analyses the PHR received from the UE and notifies the scheduler 915 of the PH of the UE. The controller 910 determines the maximum transmission resource amount and coding rate available for the UE using the PH and the $P_{CMAX}$ reported in the PHR and notifies the scheduler 915 of the determined values. The controller 910 controls the multiplexer/demultiplexer 920 in order to generate downlink data provided to the transceiver 905 according to the scheduling information provided by the scheduler 915.

If the PHR MAC CE is received from the UE, the control unit 910 analyzes the PHR MAC CE and determines the $P_{CMAX}$ appropriate for the PUSCH transmission power of the UE and determines the PH for each cell according to the difference between the PUSCH transmission power and the $P_{CMAX}$ of each cell. At this time, the controller 910 determines the position of the PH depending on priority order of the cells in the PHR MAC CE and checks the PH at the determined position. The controller 910 also determines whether the $P_{CMAX}$ for each cell is included in the PHR MAC CE and, if $P_{CMAX}$ for at least one cell is included, determines the $P_{CMAX}$. Alternatively, if no other $P_{CMAX}$ for the remaining cells is included, the controller 910 determines the $P_{CMAX}$ for the remaining cells according to the included $P_{CMAX}$. Here, the PHR MAC CE is configured on a per cell basis and includes information for indicating whether the PH and the $P_{CMAX}$ are included and whether the PUSCH transmission occurs. If it is determined that there is no PUSCH transmission in at least one cell, the controller 910 uses a predetermined value for the cell having no PUSCH transmission as $P_{CMAX}$.

The scheduler 915 is responsible for allocating transmission resources to a UE in consideration of a buffer state, a channel state, and a power headroom state of the UE. The scheduler 915 controls the transceiver 905 so as to process the signal received from UE and in order to transit a signal to the UE. At this time, the scheduler 915 performs scheduling for the PUSCH transmission of the UE such that the PUSCH transmission power does not exceed the $P_{CMAX}$ according to the PH.

Figure 10:
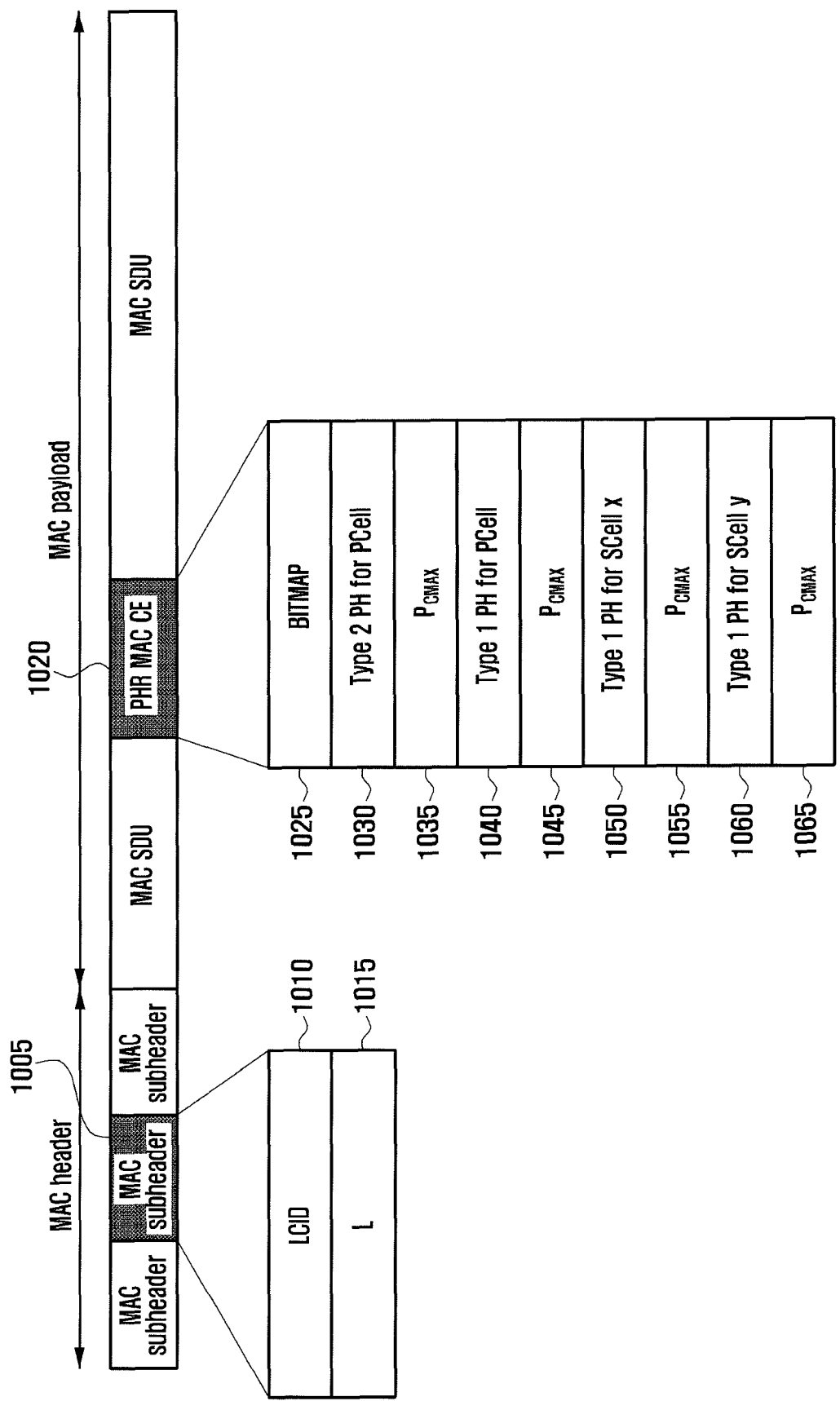
FIG. 10 is a diagram illustrating a configuration of a PHR MAC CE for use in an uplink scheduling method according to an exemplary embodiment of the present invention.

FIG. 10 is a diagram illustrating a configuration of a PHR mace CE for use in an uplink scheduling method according to an exemplary embodiment of the present invention.

The exemplary embodiment of the present invention, as shown in FIG. 10, provides a method and apparatus for selecting a PHR format according the condition of the UE.

Referring to FIG. 10, if a REL-10 PHR is configured, the UE encapsulates the following information in a PHR MAC CE 1020. That is, the PHR MAC CE 1020 includes a bitmap 1025, a type 2 PH 1030 for the PCell, a type 1 PH 1040 for the PCell 1040, type 1 PHs 1050 and 1060 for the SCells, and $P_{CMAX}$ information 1035, 1045, 1055, and 1065.

The bitmap 1025 is information indicating whether PH information for the SCell is included in the PHR MAC CE. The type 2 PH 1030 for PCell indicates the type 2 PH for the PCell. A Type 2 PH is the value obtained by subtracting the PUSCH transmission power and a Physical Uplink Control Channel (PUCCH) transmission power from the maximum transmission power. The Type 2 PH is for scheduling the PUSCH and the PUCCH transmissions of the UE. A type 1 PH is the value obtained by subtracting the PUSCH transmission power from the maximum transmission power. The type 1 PHs 1050 and 1060 for SCells are the type 1 PHs for SCells that are in an active state at a time when the PHR is generated. The $P_{CMAX}$ information 1035, 1045, 1055, and 1065 indicate the maximum transmission power used for calculating the PHs. Here, when the PHs are calculated with the PH calculation scheme 2, then the $P_{CMAX}$ information 1035, 1045, 1055, and 1065 can be omitted.

Furthermore, as shown in FIG. 10, a MAC sub header 1005 corresponding to the PHR MAC CE 1020 includes an LCID field 101 and an L field 1015, wherein the L field indicates a size of the PHR MAC CE 1020.

Referring to FIG. 10, the present invention is not limited thereto, and some of the information may unnecessary. For example, if no SCell is configured or the SCell is configured without an uplink for the UE while the REL-10 PHR is configured, then the uplink transmission of the UE occurs in the PCell, such that there is no need to report the type 1 PHs 1050 and 1060 for SCells. Since there is no need to report the type 1 PHs 1050 and 1060 for SCells, it is also unnecessary to transmit the bitmap 1025. The length of a PHR MAC CE is variable according to a number of the type 1 PHs 1050 and 1060 for SCells that are reported. In a case where no type 1 PHs for SCells are reported, then the length of the PHR MAC CE is not variable, and thus the L field 1015 is not necessary in the MAC sub header 1005. The type 2 PH 1030 for PCell is used for when the UE can perform the PUSCH transmission and the PUCCH transmission simultaneously, and as such, it is only necessary for the simultaneous transmission of the PUSCH and the PUCCH transmissions.

The present exemplary embodiment of the present invention relates to the method for configuring the L field, the bitmap, and the type 2 PH for PCell selectively. That is, some of the fields depicted in FIG. 10, such as the L field, the bitmap field, and the type 2 PH field, are set depending on the situation.

Figure 11:
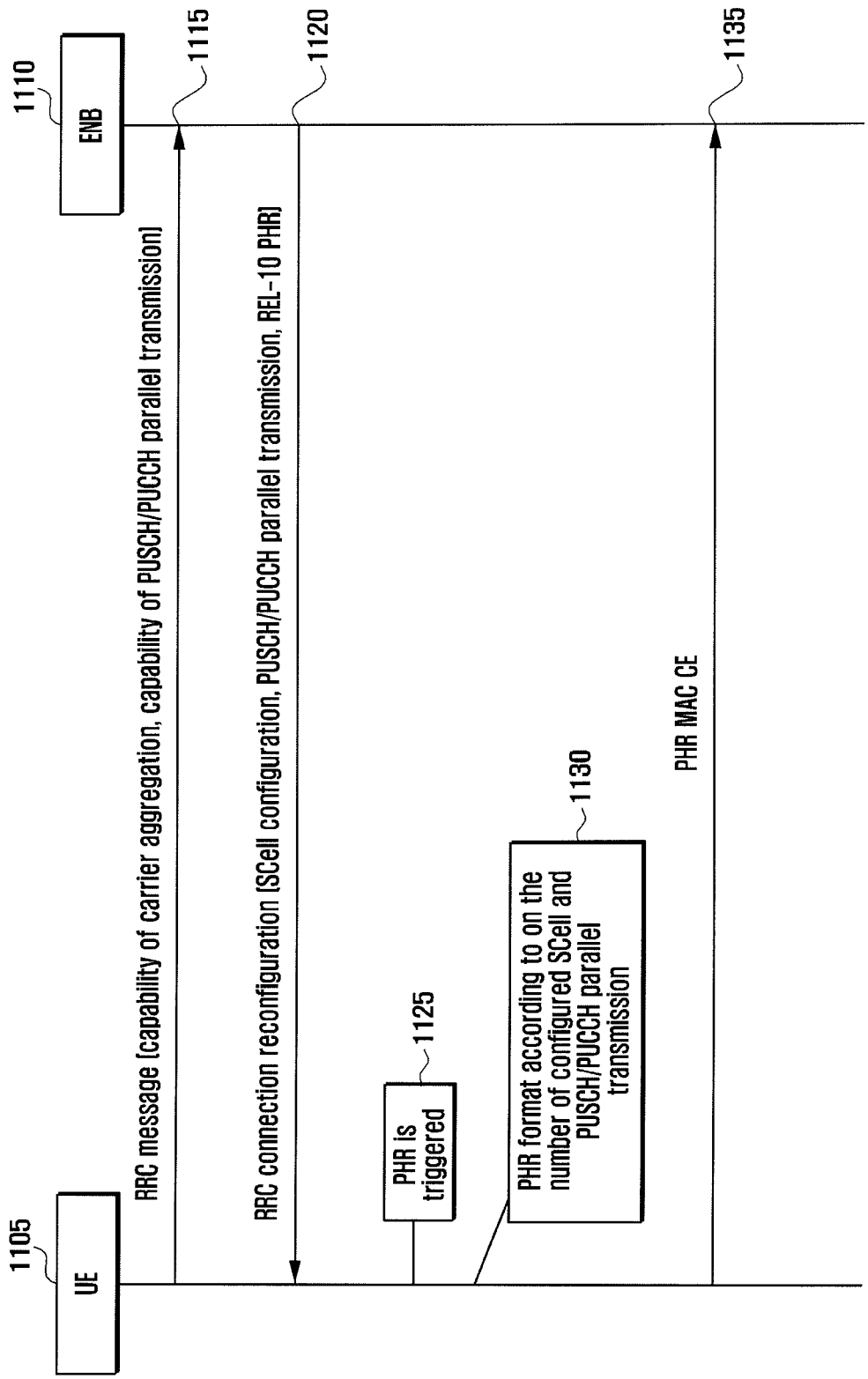
FIG. 11 is a signaling diagram illustrating uplink signaling procedure between a UE and an eNB according to an exemplary embodiment of the present invention.

FIG. 11 is a signaling diagram illustrating uplink signaling procedure between a UE and an eNB according to an exemplary embodiment of the present invention.

Referring to FIG. 11, the UE 1105 reports its capability information to the eNB 1110 through a predetermined RRC message signaling in step 1115. For example, the RRC message includes the information on whether the PUSCH and the PUCCH are transmitted simultaneously and the number of SCells that can be accumulated on a frequency band.

Next, the eNB 1110 configures the function related to the REL-10 PHR for the UE 1105 in consideration of the capability information and traffic condition of the UE 1105 and a load state of the cell. The eNB 1110 can transmit an RRC connection reconfiguration message to the UE 1105 in order to configure the SCell for the UE 1105 in step 1120. A SCell can be configured with only a downlink channel (hereinafter, such a cell is referred to as a downlink SCell) or both a downlink and an uplink channel (hereinafter, such a cell is referred to as a downlink/uplink SCell). If the UE 1105 operates mainly with the downlink traffic, the eNB 1110 assign a downlink SCell to the UE 1105. If the UE 1105 operates approximately equally with the downlink and uplink traffic, then the eNB 1110 assigns a downlink/uplink SCell to the UE 1105. The eNB 1110 also notifies the UE 1105 of whether the PUCCH/PUSCH parallel transmission is allowed for the UE 1105 and whether the REL-10 PHR is configured. The PUCCH/PUSCH parallel transmission is configured for the UE 1105 having a good channel condition from among UEs reported have the capability for the PUCCH/PUSCH parallel transmission.

The UE 1105 performs a connection reconfiguration according to an instruction in a RRC connection reconfiguration message. Afterward, if a PHR is triggered at a time point in step 1125, then the UE 1105 generates a PHR in step 1130 and transmit the PHR to the eNB 1110 in step 1135. At this time, the PHR format, which determines the fields to be included in PHR, is determined depending on whether the REL-10 PHR function is configured for the UE 1105, whether at least one SCell using an uplink channel is configured for the UE 1105, and whether the UE 1105 can perform the PUCCH/PUSCH parallel transmission. If the REL-10 PHR function is not configured for the UE 1105, then the UE 1105 encapsulates the type 1 PH for PCell in the PHR MAC CE. If the REL-10 PHR function is configured for the UE 1105, then the UE encapsulates the following information in addition to the type 1 PH and the $P_{CMAX}$ for PCell in the PHR according to a situation or state of the UE 1105.

If a downlink/uplink SCell is configured and if the PUCCH/PUSCH parallel transmission is configured, then the UE 1105 enables the L field in the PHR MAC CE sub-header and the bit map, the type 2 PH for PCell, and the type 1 PHs for SCells in the PHR MAC CE. If the downlink/uplink SCell is configured and if the PUCCH/PUSCH parallel transmission is not configured, the UE 1105 enables the L field in the PHR MAC CE sub-header and the bit map and enables type 1 PHs for SCells in the PHR MAC CE.

Whereas, if no downlink/uplink SCell is configured, and if the PUCCH/PUSCH parallel transmission is configured, then the UE 1105 disables the L field in the PHR MAC CE sub-header and enables the type 2 PH for PCell in the PHR MAC CE. If the downlink/uplink SCell is not configured and if the PUCCH/PUSCH parallel transmission is not configured, then the UE 1105 enables only the basic information fields of the PHR MAC CE sub-header and the PHR MAC CE.

That is, the UE 1105 determines whether to enable the L field and bitmap according to whether the downlink/uplink SCell is configured. The UE 1105 also determines whether to enable the type 2 PH for PCell according to whether the PUCCH/PUSCH parallel transmission is configured.

Figure 12:
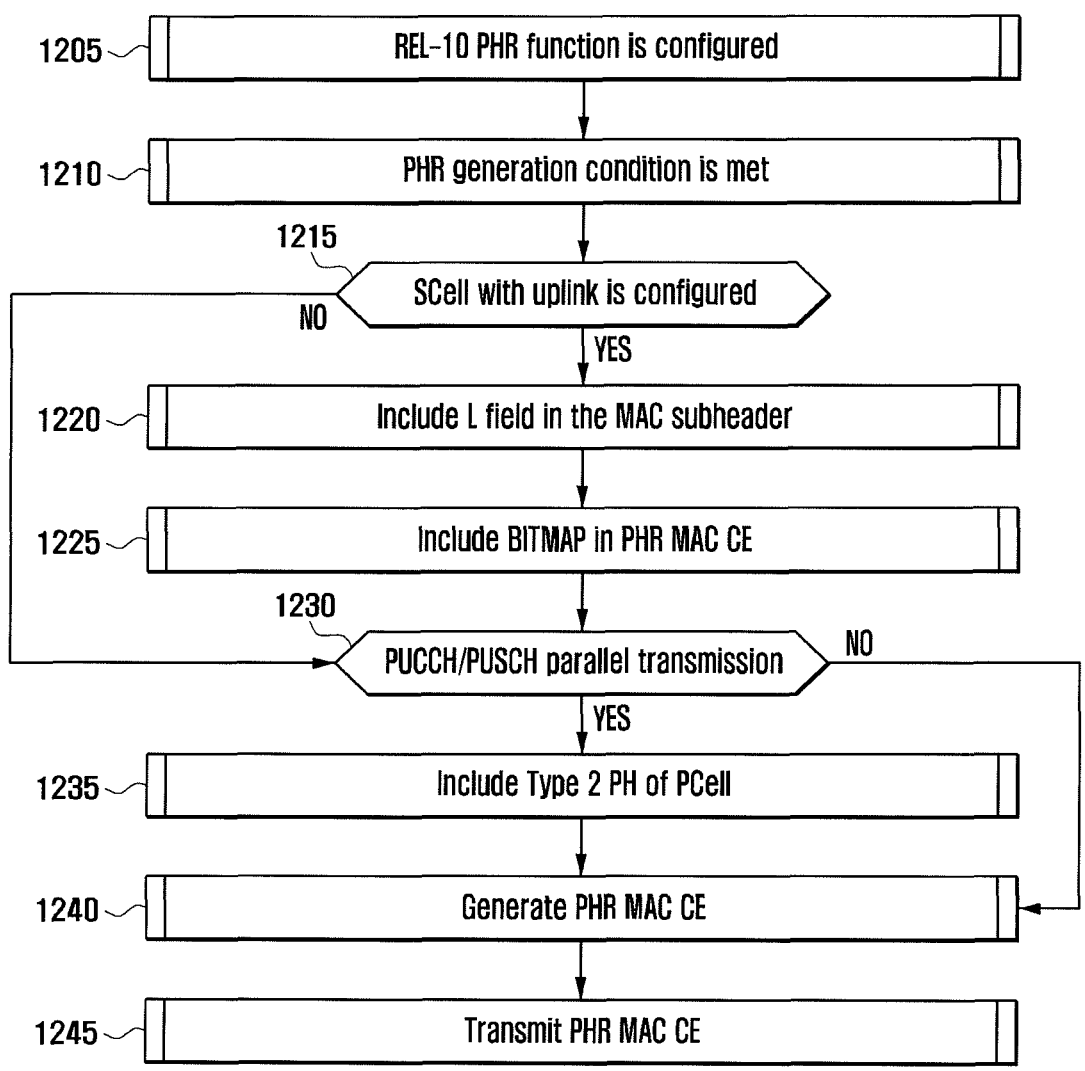
FIG. 12 is a flowchart illustrating a UE procedure for uplink scheduling method according to the second exemplary embodiment of the present invention.

FIG. 12 is a flowchart illustrating a UE procedure for uplink scheduling method according to the second exemplary embodiment of the present invention.

Referring to FIG. 12, a UE configures the REL-10 PHR function in step 1205. The REL-10 PHR function is an extended PHR function, which differs from the REL-8 PHR function in format and type of information reported, and can be configured through RRC control message signaling for activating the REL-10 technology. Next, the UE waits until a PHR generation condition is fulfilled while performing a predetermined operation. The PHR generation condition is fulfilled when there are transmission resources available for a new uplink transmission, a timer restricting PHR transmission has expired or is currently running, and a path loss of at least one cell from among the cells fulfilling a predetermined condition changes to be over a predetermined threshold value.

Here, the cell fulfilling the PHR generation condition is a cell reporting the power headroom from among the cells in an active state, i.e., the SCell that is configured as a path loss reference cell of the PCell. The path loss reference cell is the cell that is referred to when calculating the uplink transmission power as specified in the 3GPP TSs 36.331 and 36.213.

Next, if the PHR is triggered at a certain time point, or in other words, if the PHR generation condition is met in step 1210, then the UE determines the information to be included in the PHR in step 1215. In other words, the UE determines whether an uplink SCell is configured at step 1215. If no downlink/uplink SCell is configured, or in other words, if a downlink SCell is configured for the UE, then the UE disables the L field in the PHR MAC CE sub-header and the bitmap in the PHR MAC CE, and the procedure goes to step 1230. If a downlink/uplink SCell is configured, then the procedure goes to step 1220.

At step 1220, the UE includes the L field in the MAC sub-header which indicates the length of the PHR MAC CE. The length of the PHR MAC CE is determined by a number of SCells supporting uplink transmission from among the SCells in an active state, a number of $P_{CMAX}$ information, and whether the type 2 PHs exist, at the time point when the PHR is generated. Next, the UE determines the SCells for which PHs are reported in the PHR, generates a bitmap in which the bits corresponding to the cell identifiers of the SCells are set to 1, and inserts the bitmap in the first byte of the PHR MAC CE in step 1225. Here, the bitmap is composed of 8 bits of which the most significant bit is used as a cell identifier 7, the next most significant bit is used as a cell identifier 6, and so one, wherein the least significant bit is used as a cell identifier 1. That is, the bit positions of the bitmap respectively correspond to the cell identifiers.

Next, the UE determines whether the PUCCH/PUSCH parallel transmission is configured in step 1230. If the PUCCH/PUSCH parallel transmission is configured, then the UE arranges the type 2 PHs for PCells in the first byte, when no bitmap exists, or the second byte, when the bitmap exists, of the PHR MAC CE in step 1235, and the procedure goes to step 1240. Otherwise, at step 1230, if it is determined that the PUCCH/PUSCH parallel transmission is not configured, then the procedure goes to step 1240. At step 1240, the UE generates the PHR MAC CE by inserting the type 1 PH for PCell and other necessary information, such as the $P_{CMAX}$ and the type 1 PHs for the SCells when an active SCell supporting uplink transmission exists. Finally, the UE transmits the PHR MAC CE in step 1245.

The configuration of the UE according to the present exemplary embodiment of the present invention is similar to that as depicted in FIG. 8 except for the controller 810. The controller 810 of the UE according to the present embodiment of the present invention analyzes the scheduling command, i.e., the uplink grant, that is received through the transceiver 805 and controls the transceiver 805 and the multiplexer/demultiplexer 820 to perform uplink transmission on appropriate transmission resources at appropriate time points. If the PHR trigger condition is fulfilled, the controller 810 controls PHR procedure. In such a case, the controller 810 determines whether to include the L field, a bitmap, and type 2 PHs of PCells according to whether the downlink/uplink cell is configured and whether the PUCCH/PUSCH parallel transmission is configured. The controller 810 then generates the payload of PHR MAC CE, and transfers the payload of PHR MAC CE to the multiplexer/demultiplexer 820.

As described above, the uplink scheduling apparatus and method as described in the exemplary embodiments of the present invention is capable of reducing the power headroom report overhead, resulting in an improvement of eNB's scheduling efficiency and a reduction of interference with other uplink transmissions.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by a terminal in a wireless communication system, the method comprising:
   receiving, from a base station, a radio resource control (RRC) message for configuring a power headroom report (PHR);
   identifying whether the PHR is triggered;
   in case that the PHR is triggered and more than one activated serving cells with configured uplink is configured:
     obtaining a first type power headroom (PH) per each of the activated serving cells and a second type PH for a primary cell (PCell); and
   transmitting, to the base station, a PHR including the first type PH per each of the activated serving cells and the second type PH for the PCell and an indicator indicating whether a maximum transmission power associated with a corresponding one of the first type PH or the second type PH is included in the PHR.

2. The method of claim 1, further comprising:
   in case that the PHR is triggered and one activated serving cell is configured:
     obtaining the first type PH for the one activated serving cell; and
     transmitting, to the base station, a PHR including the first type PH for the one activated serving cell.

3. The method of claim 2, wherein the PHR, including the first type PH for the one activated serving cell, further includes a maximum transmission power used for a calculation of the first type PH for the one activated serving cell without the indicator.

4. The method of claim 1,
wherein a physical uplink shared channel (PUSCH) reference format is used for obtaining the corresponding one of the first type PH or the second type PH and the maximum transmission power is omitted in the PHR, when the corresponding one of the first type PH or the second type PH is not based on a real transmission, wherein a real PUSCH transmission power is used for obtaining the corresponding one of the first type PH or the second type PH and the maximum transmission power is included in the PHR, when the corresponding one of the first type PH or the second type PH is based on the real transmission, and
wherein at least one of a first parameter related to a number of assigned transmission resources and a second parameter related to a modulation coding scheme (MCS) lever is 0, when the PUSCH reference format is used.

5. The method of claim 1, wherein the second type PH for the PCell is contained first in the PHR, and the first type PH per each of the activated serving cells are contained in the PHR in ascending order based on an cell index of the activated serving cells.

6. A terminal in a wireless communication system, the terminal comprising:
a transceiver; and
a controller coupled with the transceiver and configured to:
receive, from a base station, a radio resource control (RRC) message for configuring a power headroom report (PHR),
identify whether the PHR is triggered, and
in case that the PHR is triggered and more than one activated serving cells with configured uplink is configured:
obtain a first type power headroom (PH) per each of the activated serving cells and a second type PH for a primary cell (PCell), and
transmit, to the base station, a PHR including the first type PH per each of the activated serving cells and the second type PH for the PCell and an indicator indicating whether a maximum transmission power associated with a corresponding one of the first type PH or the second type PH is included in the PHR.

7. The terminal of claim 6, wherein the controller is further configured to, in case that the PHR is triggered and one activated serving cell is configured:
obtain the first type PH for the one activated serving cell, and
transmit, to the base station, a PHR including the first type PH for the one activated serving cell.

8. The terminal of claim 7, wherein the PHR including the first type PH for the one activated serving cell, further includes a maximum transmission power used for a calculation of the first type PH for the one activated serving cell without the indicator.

9. The terminal of claim 6,
wherein a physical uplink shared channel (PUSCH) reference format is used for obtaining the corresponding one of the first type PH or the second type PH and the maximum transmission power is omitted in the PHR, when the corresponding one of the first type PH or the second type PH wherein a real PUSCH transmission power is used for obtaining the corresponding one of the first type PH or the second type PH and the maximum transmission power is included in the PHR, when the corresponding one of the first type PH or the second type PH is based on the real transmission, and
wherein at least one of a first parameter related to a number of assigned transmission resources and a second parameter related to a modulation coding scheme (MCS) lever is 0, when the PUSCH reference format is used.

10. The terminal of claim 6, wherein the second type PH for the PCell is contained first in the PHR, and the first type PH per each of the activated serving cells are contained in the PHR in ascending order based on an cell index of the activated serving cells.

11. A method by a base station in a wireless communication system, the method comprising:
transmitting, to a terminal, a radio resource control (RRC) message for configuring a power headroom report (PHR); and
receiving, from the terminal, a PHR in case that the PHR is triggered and more than one activated serving cells with configured uplink is configured for the terminal,
wherein the PHR includes a first type power headroom (PH) per each of the activated serving cells, a second type PH for a primary cell (PCell) and an indicator indicating whether a maximum transmission power associated with a corresponding one of the first type PH or the second type PH is included in the PHR.

12. The method of claim 11, further comprising:
receiving, from the terminal, a PHR including a first type PH for the one activated serving cell, in case that the PHR is triggered and one activated serving cell is configured.

13. The method of claim 12, wherein the PHR, including the first type PH for the one activated serving cell, further includes a maximum transmission power used for a calculation of the first type PH for the one activated serving cell without the indicator.

14. The method of claim 11,
wherein a physical uplink shared channel (PUSCH) reference format is used for obtaining the corresponding one of the first type PH or the second type PH and the maximum transmission power is omitted in the PHR, when the corresponding one of the first type PH or the second type PH is not based on a real transmission,
wherein a real PUSCH transmission power is used for obtaining the corresponding one of the first type PH or the second type PH and the maximum transmission power is included in the PHR, when the corresponding one of the first type PH or the second type PH is based on the real transmission, and
wherein at least one of a first parameter related to a number of assigned transmission resources and a second parameter related to a modulation coding scheme (MCS) lever is 0, when the PUSCH reference format is used.

15. The method of claim 11, wherein the second type PH for the PCell is contained first in the PHR, and the first type PH per each of the activated serving cells are contained in the PHR in ascending order based on an cell index of the activated serving cells.

16. A base station in a wireless communication system, the base station comprising:

a transceiver; and a controller coupled with the transceiver and configured to:
- transmit, to a terminal, a radio resource control (RRC) message for configuring a power headroom report (PHR), and
- receive, from the terminal, a PHR in case that the PHR is triggered and more than one activated serving cells with configured uplink is configured for the terminal, wherein the PHR includes a first type power headroom (PH) per each of the activated serving cells, a second type PH for a primary cell (PCell) and an indicator indicating whether a maximum transmission power associated with a corresponding one of the first type PH or the second type PH is included in the PHR.

17. The base station of claim 16, wherein the controller is further configured to receive, from the terminal, a PHR including a first type PH for the one activated serving cell, in case that the PHR is triggered and one activated serving cell is configured.

18. The base station of claim 17, wherein the PHR, including the first type PH for the one activated serving cell, further includes a maximum transmission power used for a calculation of the first type PH for the one activated serving cell without the indicator.

19. The base station of claim 16, wherein a physical uplink shared channel (PUSCH) reference format is used for obtaining the corresponding one of the first type PH or the second type PH and the maximum transmission power is omitted in the PHR, when the corresponding one of the first type PH or the second type PH is not based on a real transmission, wherein a real PUSCH transmission power is used for obtaining the corresponding one of the first type PH or the second type PH and the maximum transmission power is included in the PHR, when the corresponding one of the first type PH or the second type PH is based on the real transmission, and wherein at least one of a first parameter related to a number of assigned transmission resources and a second parameter related to a modulation coding scheme (MCS) lever is 0, when the PUSCH reference format is used.

20. The base station of claim 16, wherein the second type PH for the PCell is contained first in the PHR, and the first type PH per each of the activated serving cells are contained in the PHR in ascending order based on an cell index of the activated serving cells.

* * * * *